United States Patent [19]

Steinberg

[11] Patent Number: 5,373,800
[45] Date of Patent: Dec. 20, 1994

[54] SEA VESSEL

[76] Inventor: Amiram Steinberg, 11 Lochamei Gallipoli Street, Moshav Avichail, 42 910, Israel

[21] Appl. No.: 9,444

[22] Filed: Jan. 22, 1993

Related U.S. Application Data

[63] Continuation of Ser. No. 935,634, Aug. 24, 1992, abandoned, which is a continuation of Ser. No. 618,367, Nov. 26, 1990, abandoned.

[30] Foreign Application Priority Data

Dec. 1, 1989 [IL]  Israel ...................................... 92526

[51] Int. Cl.⁵ ................................................. B63B 1/30
[52] U.S. Cl. .................................... 114/282; 114/313; 114/332; 440/15
[58] Field of Search ............... 114/274, 280, 282, 281, 114/313, 321, 332, 337, 338, 339, 340; 440/14, 15, 38; 244/105, 106

[56] References Cited

U.S. PATENT DOCUMENTS

| | | | |
|---|---|---|---|
| 1,458,844 | 6/1923 | Perkins | 114/332 |
| 2,073,438 | 3/1937 | Adams | 244/105 |
| 2,330,764 | 9/1943 | Troth | 440/14 |
| 2,611,321 | 9/1952 | Shafer | 440/15 |
| 2,676,771 | 4/1954 | Mayo | 244/105 |
| 2,720,367 | 10/1955 | Doolittle | 114/313 |
| 2,753,135 | 7/1956 | Gouge | 244/106 |
| 2,783,955 | 3/1957 | Fitzpatrick | 114/313 |
| 2,918,029 | 12/1959 | Legat | 114/313 |
| 2,980,047 | 4/1961 | Korganoff et al. | 114/313 |
| 2,991,747 | 7/1961 | Bader . | |
| 3,082,975 | 3/1963 | Cardwell et al. | 114/313 |
| 3,085,533 | 4/1963 | Goryl et al. | 114/321 |
| 3,092,060 | 6/1963 | Reid | 114/313 |
| 3,118,639 | 6/1964 | Kiceniuk | 440/15 |
| 3,154,043 | 10/1964 | Momsen | 114/337 |
| 3,164,117 | 1/1965 | Lopez . | |
| 3,183,871 | 5/1965 | Reder . | |
| 3,200,781 | 8/1965 | Takagi | 114/282 |
| 3,250,238 | 5/1966 | Reder | 114/313 |
| 3,267,897 | 8/1966 | Picker | 114/281 |
| 3,302,602 | 2/1967 | Korganoff | 114/313 |
| 3,357,389 | 12/1967 | Wray . | |
| 3,390,655 | 7/1968 | Quady et al. | 114/281 |
| 3,546,609 | 7/1969 | Nott | 114/281 |
| 3,698,339 | 10/1972 | Golay et al. | 114/321 |
| 3,779,199 | 12/1973 | Mayer | 114/337 |
| 3,789,789 | 2/1974 | Cleary . | |
| 3,897,743 | 8/1975 | Schoonman | 114/321 |
| 4,040,373 | 8/1977 | Jones . | |
| 4,715,304 | 12/1987 | Steinberg . | |
| 4,819,576 | 4/1989 | Shaw | 114/274 |
| 4,848,886 | 7/1989 | Pratt | 114/340 |
| 4,932,350 | 6/1990 | Takimoto | 114/339 |

FOREIGN PATENT DOCUMENTS

| | | | |
|---|---|---|---|
| 2464176 | 4/1981 | France | 114/282 |
| 251789 | 2/1927 | Italy | 114/282 |
| 13477 | of 1892 | United Kingdom | 114/337 |

*Primary Examiner*—Michael S. Huppert
*Assistant Examiner*—Thomas J. Brahan
*Attorney, Agent, or Firm*—Abelman, Frayne & Schwab

[57] ABSTRACT

A water vessel comprising a hull, at least one retractable hydrofoil apparatus configured for disposition in an extended orientation for vessel operation in a hydrofoil mode and for disposition in a retracted orientation for vessel operation in an undersea mode and propulsion apparatus providing propulsion of the vessel in both the undersea mode and the hydrofoil mode.

3 Claims, 38 Drawing Sheets

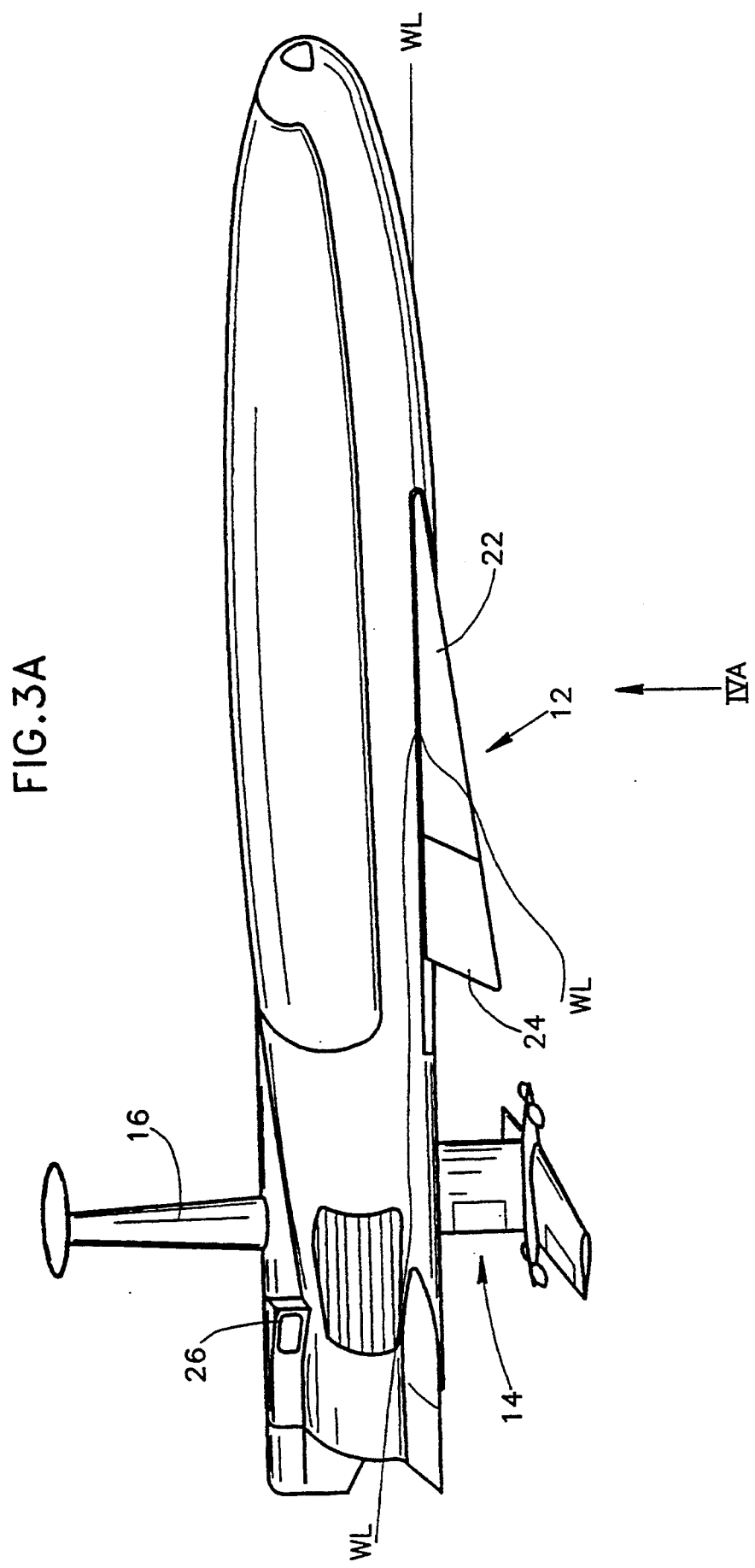

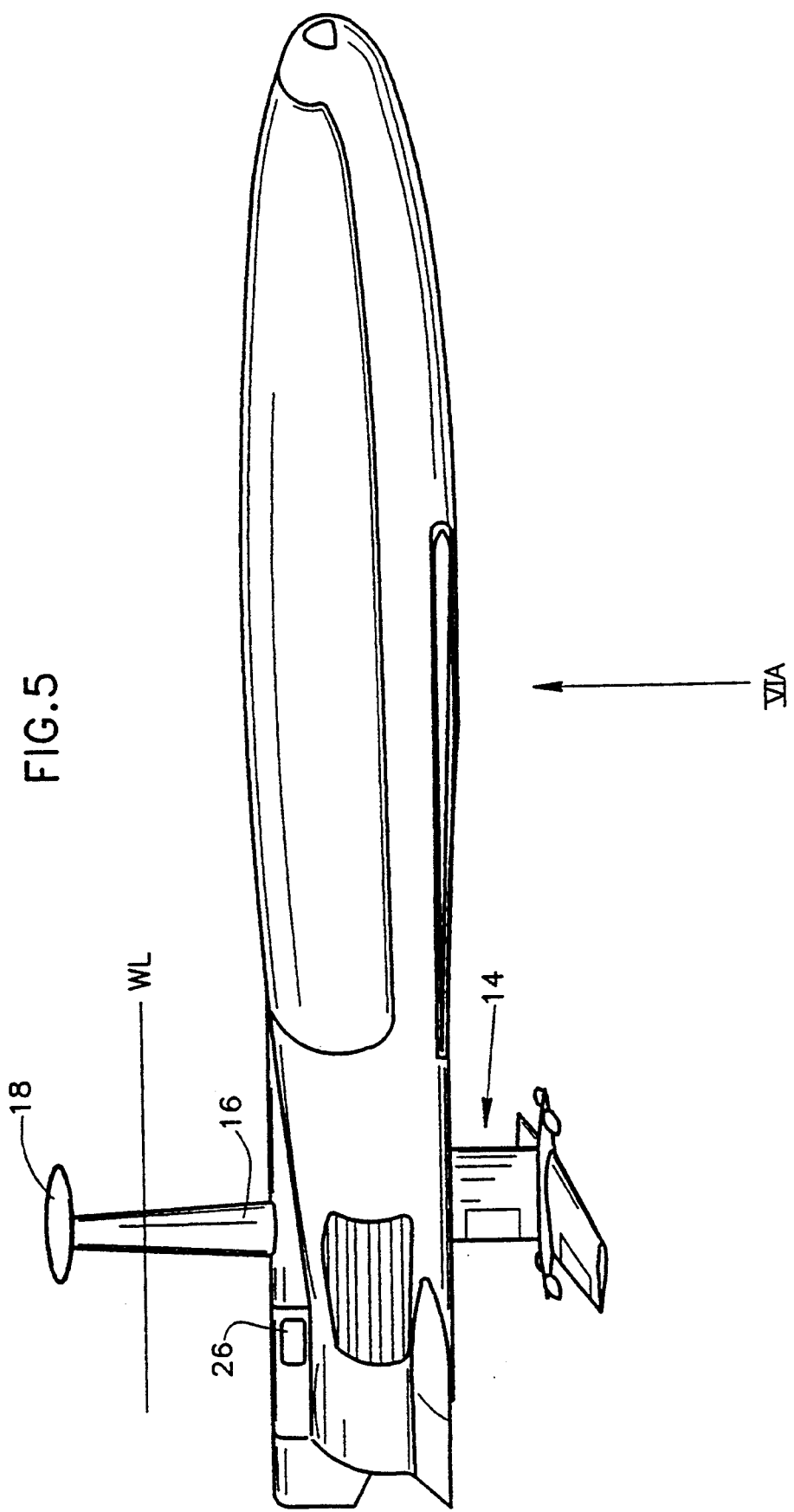

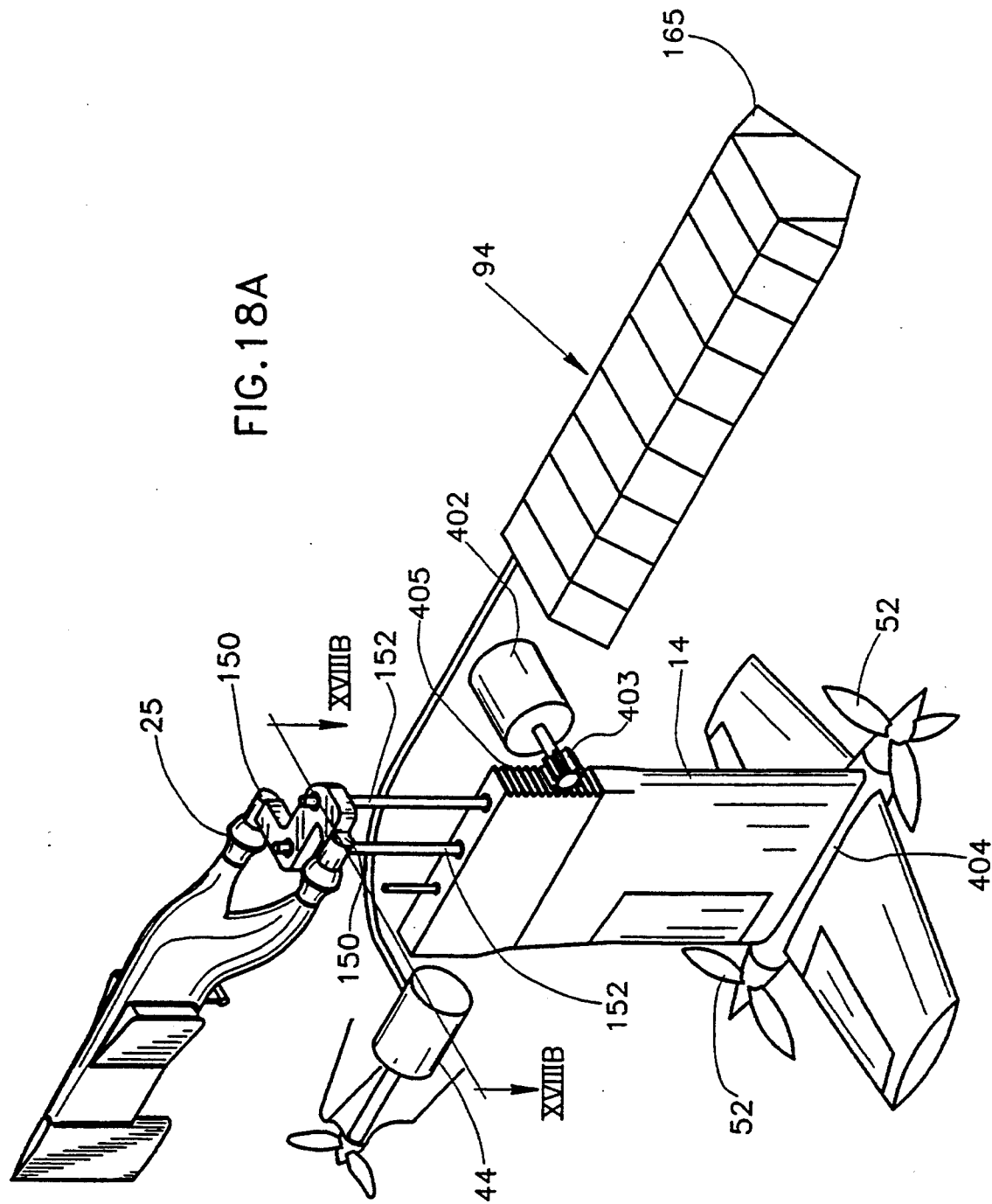

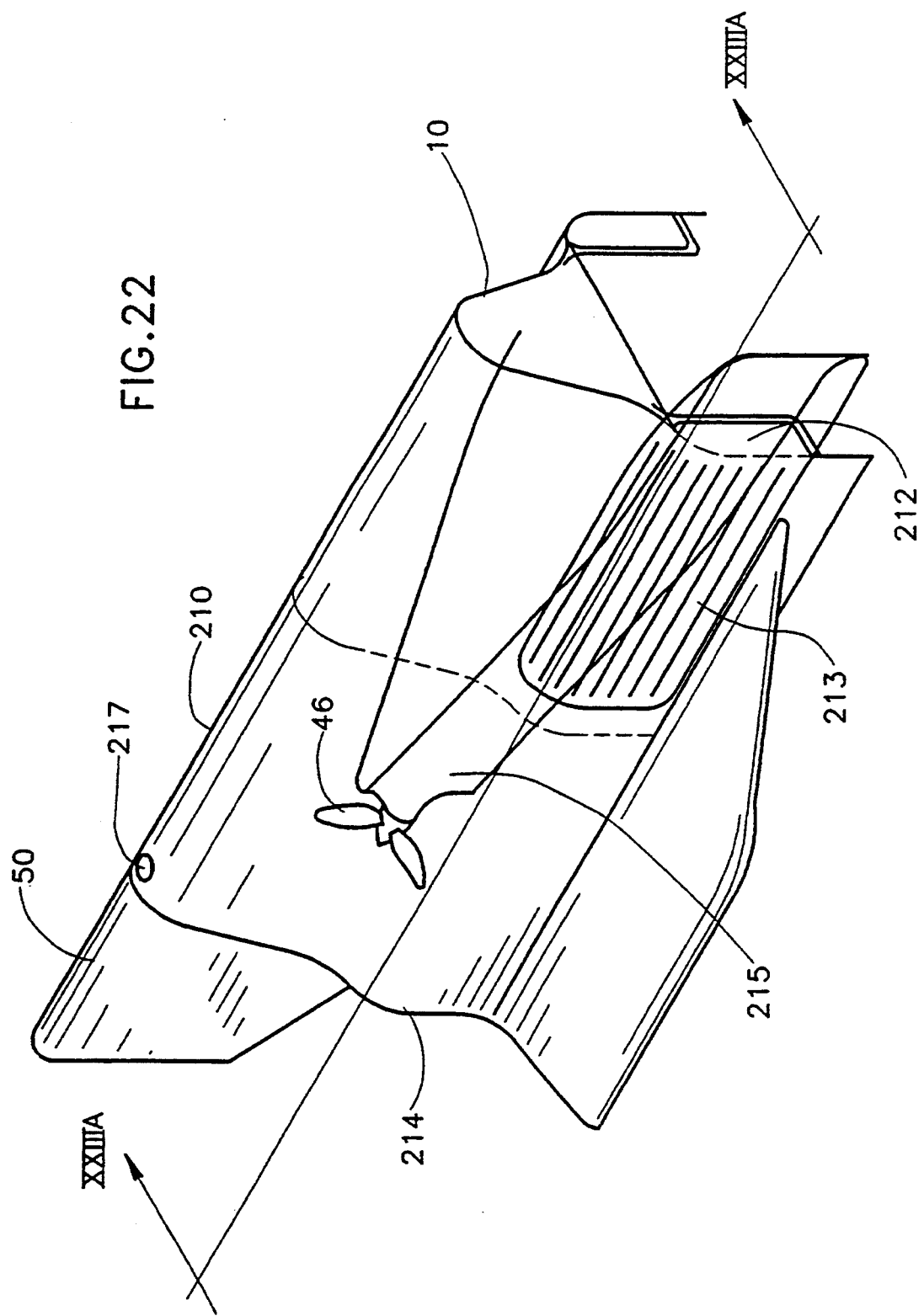

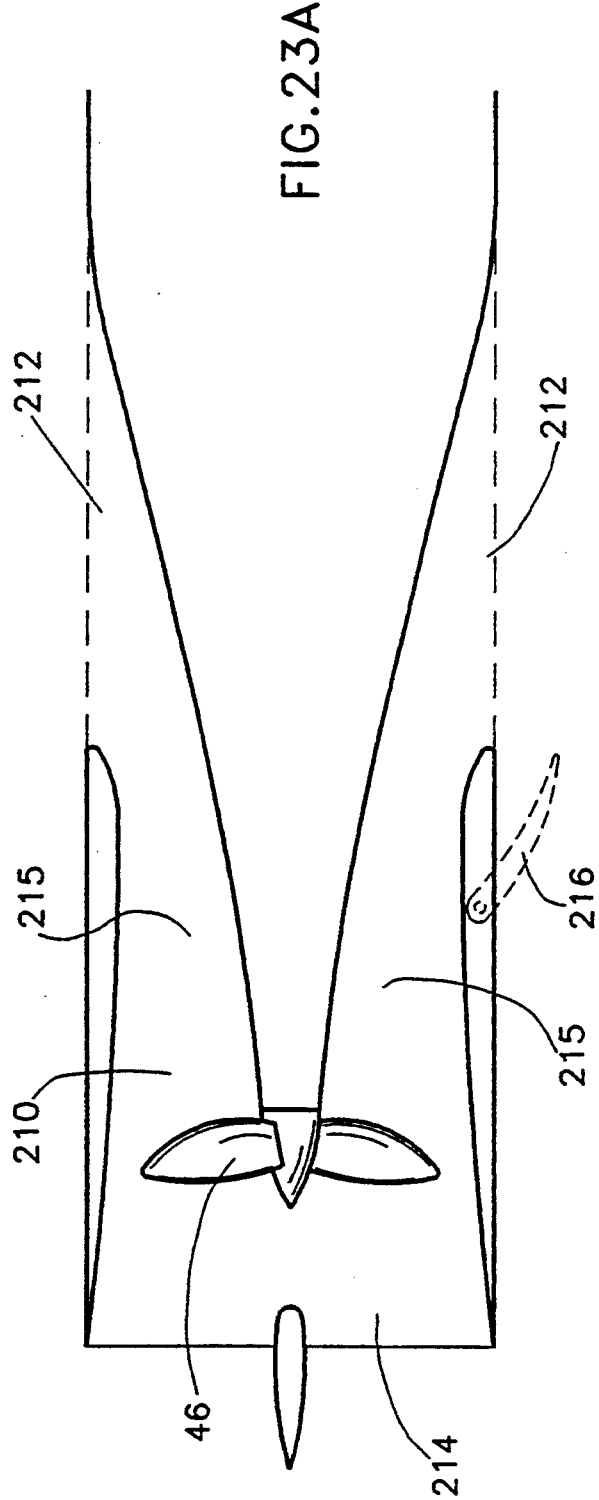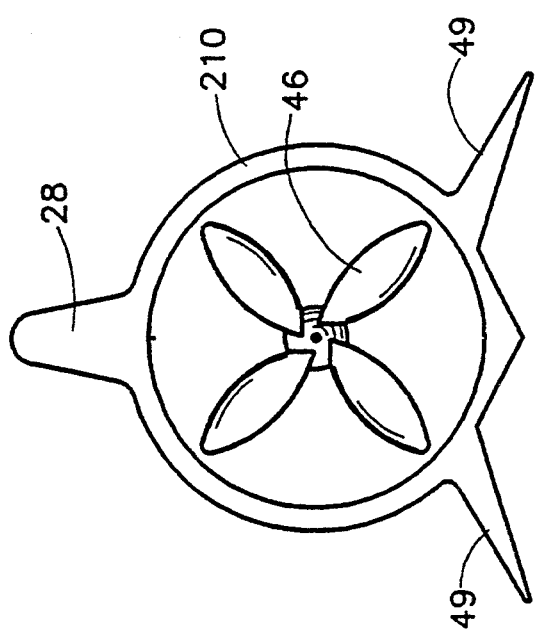

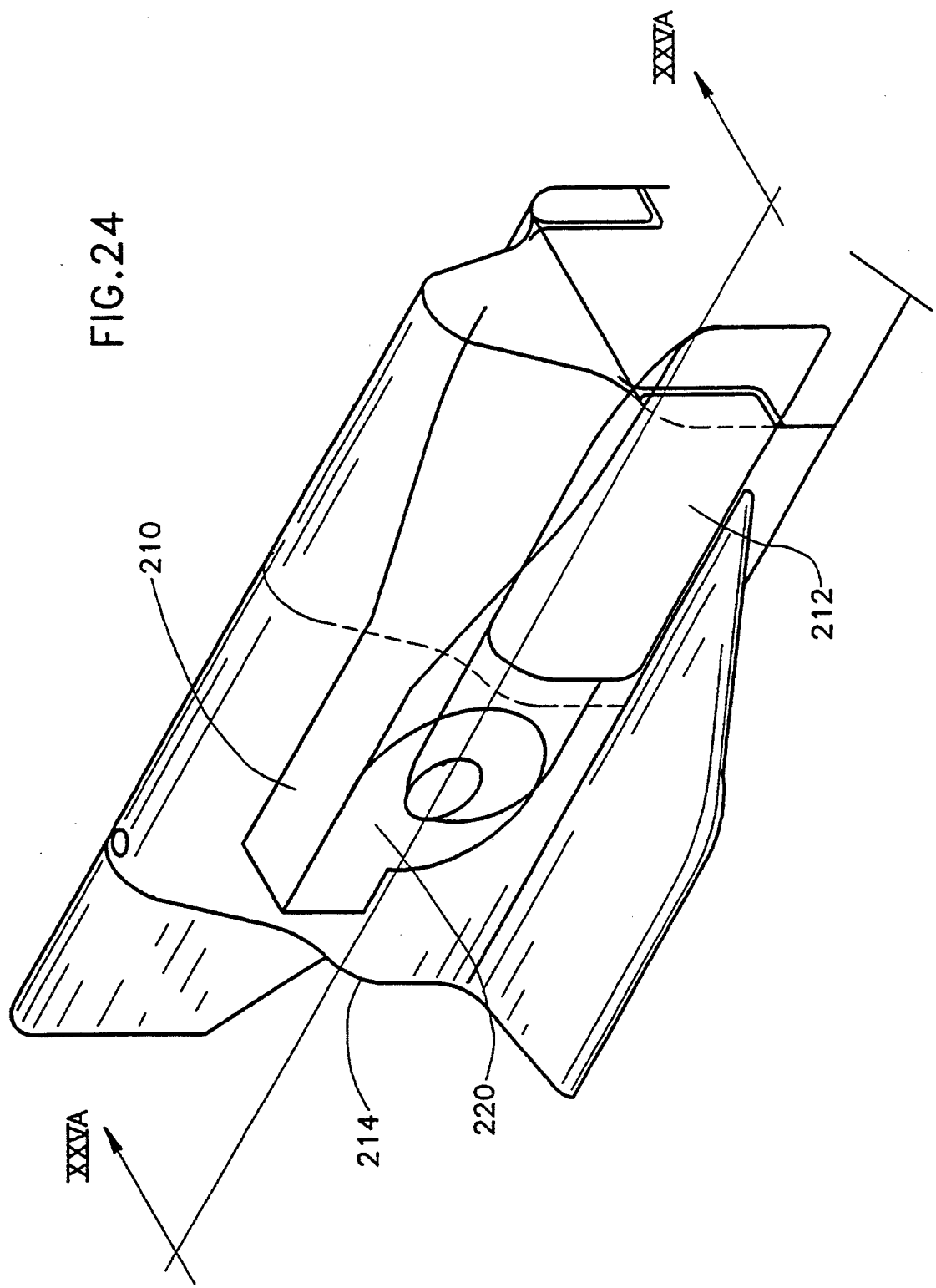

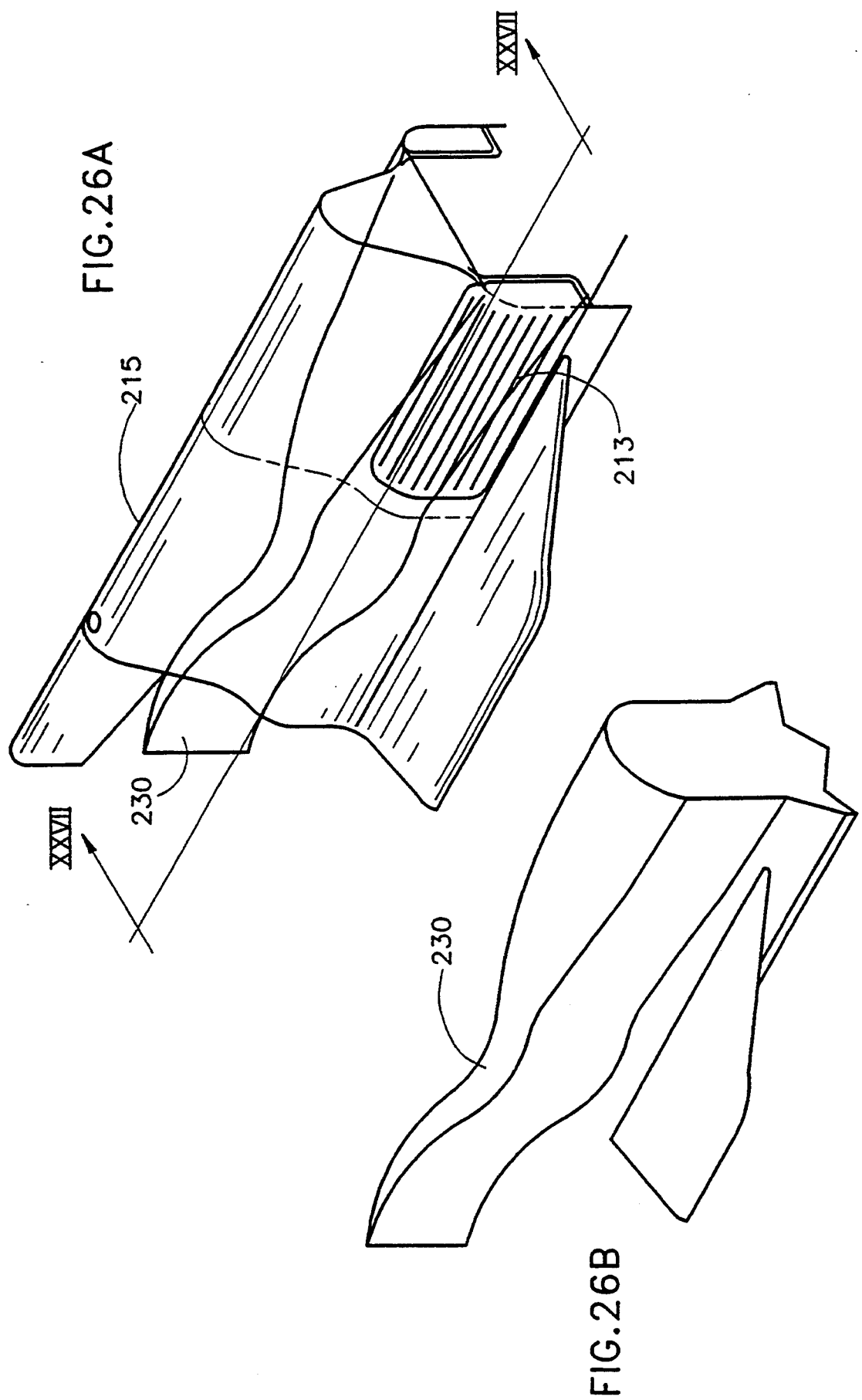

SEA VESSEL

This application is a continuation of application Ser. No. 07/935,634, filed Aug. 24, 1992, which is a continuation of Ser. No. 07/618,367 filed Nov. 26, 1990, both abandoned.

FIELD OF THE INVENTION

The present invention relates to watercraft generally and more particularly to watercraft having foils.

BACKGROUND OF THE INVENTION

Various types of watercraft having foils are known in the art. There is shown in U.S. Pat. No. 3,357,389 a hydrofoil system and method of forming lift foils for use therein which is suitable for use with a surface craft. U.S. Pat. No. 3,789,789 describes a hydrofoil sailing craft which has controllable and retractable hydrofoils.

U.S. Pat. No. 4,715,304 to the present inventor describes hydrofoil apparatus comprising a hull, a pair of hydrofoils, each including first and second planar surface portions, pivotal mounting apparatus for mounting the pair hydrofoils onto the hull, and apparatus for selectably and variably determining the dihedral angle between the first and second planar surface portions.

SUMMARY OF THE INVENTION

The present invention seeks to provide a vessel, which has the capability of undersea, planing, hydrofoil and combined planing and hydrofoil operation, all at relatively high efficiency.

There is thus provided in accordance with a preferred embodiment of the present invention a water vessel comprising a hull, at least one retractable hydrofoil apparatus configured for disposition in an extended orientation for vessel operation in a hydrofoil mode and for disposition in a retracted orientation for vessel operation in an undersea mode and propulsion apparatus providing propulsion of the vessel in both the undersea mode and the hydrofoil mode.

There is thus provided in accordance with an alternative embodiment of the present invention a water vessel comprising a hull, at least one retractable hydrofoil apparatus configured for disposition in an extended orientation for vessel operation in a hydrofoil mode and for disposition in a retracted orientation for vessel operation in a docking mode and propulsion apparatus providing propulsion of the vessel in both the docking mode and the hydrofoil mode.

Additionally in accordance with an embodiment of the invention the retractable hydrofoil apparatus is also configured for disposition in a planing orientation intermediate the extended orientation and the retracted orientation for vessel operation in a planing mode.

Additionally in accordance with an embodiment of the invention the retractable hydrofoil apparatus comprises first and second planar surfaces. The retractable hydrofoil apparatus is also configured, in accordance with a preferred embodiment of the present invention, for disposition in an undersea orientation intermediate the extended orientation and the retracted orientation whereby the dihedral angle between the first and second planar is controlled to provide roll control for vessel operation in the undersea mode.

Further in accordance with a preferred embodiment of the invention, the propulsion apparatus comprises first propulsion apparatus for propulsion of the vessel in the hydrofoil mode and second apparatus for propulsion of the vessel in the undersea mode.

Additionally in accordance with an embodiment of the invention, the first apparatus is retractable into the hull.

In accordance with an alternative embodiment of the invention, the propulsion apparatus comprises water jet propulsion apparatus which is operative to provide propulsion for the vessel in both the hydrofoil mode and the undersea mode up to a predetermined depth.

Further in accordance with an embodiment of the invention, there is provided in association with the hull fluid inflatable hull configuring apparatus for expanding the envelope of the hull for undersea operation.

Still further in accordance with a preferred embodiment of the present invention, the water vessel additionally comprises a containerized payload module shaped to match the shape of the hull of the vessel.

Moreover, in accordance with a preferred embodiment of the present invention, the water vessel additionally comprises a retractable mast for air intake and exhaust during a partially submerged operation and for supporting detectors for collecting information about the region in which the vessel currently operates.

Finally, in accordance with a preferred embodiment of the present invention, the second propulsion apparatus comprises a fishtail apparatus for undulatingly producing propulsion. The fishtail apparatus is supported by eddy amplifying jets for increasing the propulsion produced.

BRIEF DESCRIPTION OF THE DRAWINGS

The present invention will be understood and appreciated more fully from the following detailed description taken in conjunction with the drawings in which:

FIGS. 3A, 3B and 3C are pictorial illustrations of the vessel of FIG. 1 in three planing mode orientations;

FIG. 5 is a pictorial illustration of the vessel of FIG. 1 in a partially submerged orientation;

FIG. 18A is a pictorial illustration of an alternative embodiment of the propulsion system of FIG. 16;

FIG. 22 is a pictorial illustration of an undersea propulsion system useful in the embodiment of FIG. 7A;

FIG. 23A is a top section illustration taken along the lines XXIIIA—XXIIIA of FIG. 22 which additionally illustrates an alternative embodiment of a water intake nozzle;

FIG. 23B is a cross-sectional section taken along lines XXIIIB—XXIIIB of FIG. 8B;

FIG. 24 is a pictorial illustration of an alternative undersea propulsion system useful in the embodiment of FIG. 7A;

FIGS. 26A and 26B ape pictorial illustrations of a second alternative undersea propulsion system useful in the embodiment of FIG. 7A;

DETAILED DESCRIPTION OF A PREFERRED EMBODIMENT

Reference is now made to FIGS. 1A, 1B, 3A, 3B, 3C, 5, 7A and 7B which pictorially illustrate a sea craft which has the capability of undersea, planing and hydrofoil operation, all at relatively high efficiency, constructed and operative in accordance with a preferred embodiment of the present invention. Reference is also made to FIGS. 2A and 2B, 4A and 4B, 6A and 6B, and 8A and 8B. FIGS. 2A, 4A, 6A and 8A are bottom views and FIGS. 2B, 4B, 6B and 8B are side views of FIGS. 1A, 3A, 5 and 7A, respectively.

Figure 1A:
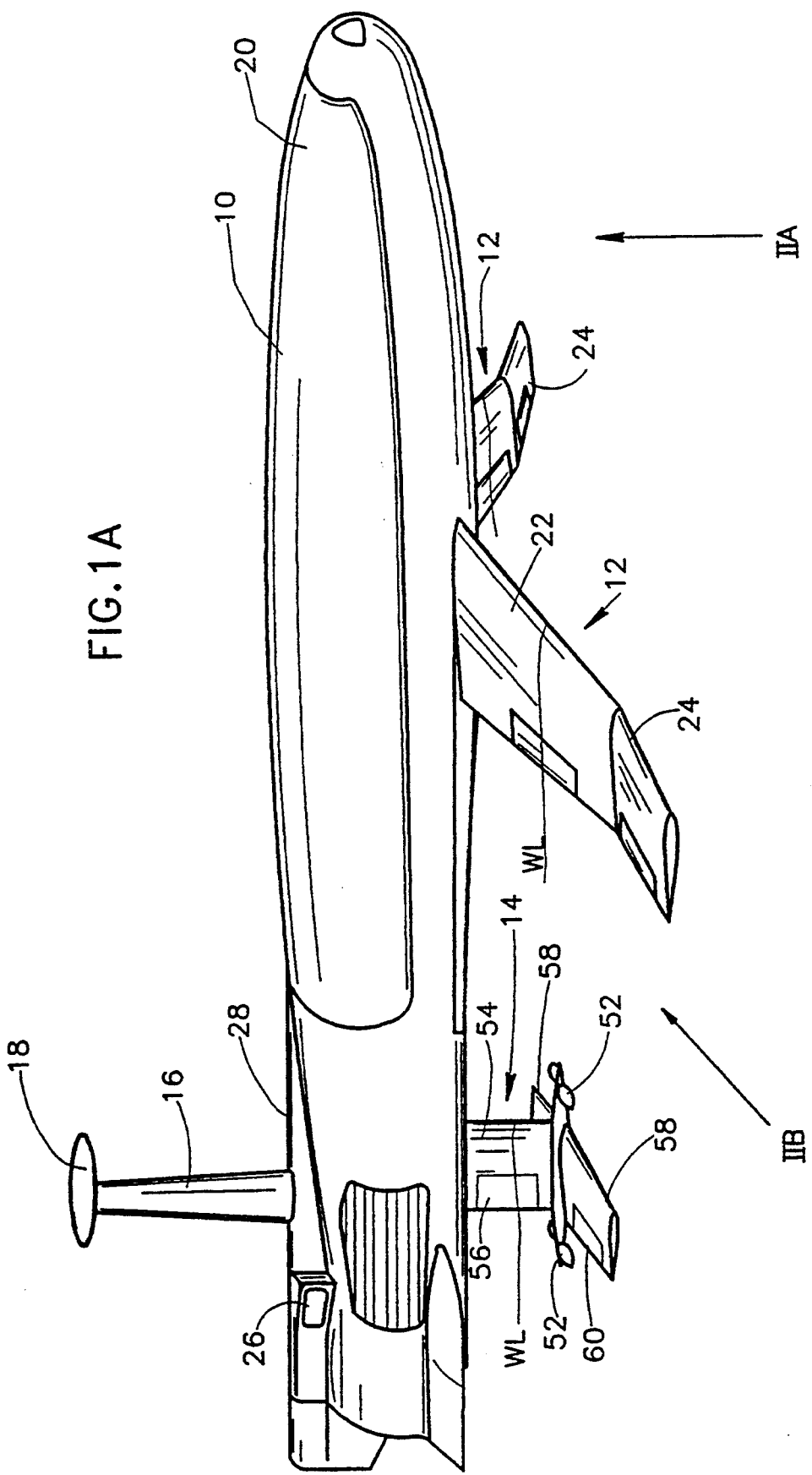
FIG. 1A is a pictorial illustration of a vessel constructed and operative in accordance with a preferred embodiment of the present invention in a hydrofoil mode orientation.

As shown in FIG. 1A, the sea craft comprises a cigarette shaped hull 10, retractable forward foils 12 for lifting the hull 10 partially above the water line, denoted WL, and a retractable rear foil 14 for propelling the sea craft through the water. The sea craft of the present invention typically also comprises a retractable mast 16 for holding detector devices, such as radar, on a detector dish 18, and a cargo container 20, denoted by a dark line on the hull 10, for storing cargo to be shipped from one location to another.

Cargo container 20 is typically an unloadable container designed to match the streamlined shape of hull 10. A multiplicity of cargo containers 20 can be built for performing a multiplicity of operations, such as for storing ore, for storing general cargo or for storing refrigerated cargo. The cargo container 20 appropriate for a given trip is loaded into the hull 10; the remaining cargo containers 20 typically stay in port. Thus, one craft may perform many differing operations.

It will be understood that the cargo container 20 can also be at least partially utilized as quarters for the crew of the craft. The quarters can be wet accommodations, where the crew must wear scuba gear, or they can be dry accommodations where scuba gear is not necessary.

FIG. 1A illustrates the sea craft of the present invention in a hydrofoil mode orientation with the forward foils 12 extended generally diagonally outwards and the rear foil 14 and the mast 16 extended vertically.

In accordance with a preferred embodiment of the present invention, the forward foils 12 are each typically comprised of a strut 22 for providing both lift to the craft and structural support to a tip 24 whose dihedral angle relative to strut 22 is changeable.

Tips 24 are the main lifting surfaces of the craft. They are typically extended such that they are generally parallel to the water surface. Since any lifting element provides lift perpendicular to its surface, the tips 24 provide lift generally perpendicular to the surface of the water and thus provide the sea craft with a significant amount of lift.

Due to the angle at which the struts 22 pierce the surface of the water, the portions of the struts 22 below the surface of the water also provide the craft with some lift. Additionally, since the struts 22 are surface piercing elements, they act as foil stabilizers for stabilizing the craft in rough weather. The deeper the struts 22 are submerged below the water, the more lift they provide. Concurrently, the additional lift pushes the struts 22 out of the water. Thus, the craft tends to a stable location in both the transverse and longitudinal directions. The stability in the longitudinal direction is produced due to the fact that, in accordance with a preferred embodiment of the present invention, the forward foils 12 are located close to and forward of the center of gravity of the craft.

It will be appreciated that, during rough weather, the foils 12 help to maintain the craft in a stable position as well as to dampen the craft motion. When a large wave hits the craft, it meets the bow first, creating a pitching moment on the As the wave reaches the middle of the craft, it produces an upward force on the craft, known as a heave. Since the entirely of the tips 24 and portions of the struts 22 are submerged in the water and are thus unable to heave instantaneously, the heave motion is dampened. However, the pitching moment causes an increase in the angle of attack of the struts 22 which increases the lift on the craft and thus, heaves the craft somewhat. The following large wave will have a lesser effect since the craft will be higher above the water than it was for the first wave. Thus, the effect of the foils 12 is to smooth the reaction of the craft to large waves. This is advantageous over planing hulls.

It will be appreciated that the structure of the forward foils has advantages over prior aft vertical struts in that the angled forward foils provide some lift forces.

It will also be appreciated that the forward foils 12 of the present invention provide, while the craft is in motion, a relatively smooth transition from a fully retracted orientation, described in mope detail hereinbelow and with reference to FIGS. 5 and 7A, to the hydrofoil mode orientation shown in FIG. 1A. Prior art vertical struts typically can only be folded into lifting location while the craft has close to zero speed.

The transition from the fully retracted orientation to the hydrofoil orientation is performed as follows. While the craft is docked and at any time that it is moving on the surface of the water without utilizing the forward foils 12, the craft operates as a displacement hull and therefore, only moves at relatively slow speeds. Preparatory to or simultaneously with the extension of the foils 12, the speed is increased. The foils 12 are smoothly extended in a continuous motion from their fully retracted orientation to their fully extended orientation and the speed is increased in proportion to the amount of the extension.

It will be appreciated that once the foils 12 are partially extended, the craft begins to operate in a planing mode, to be described in more detail, hereinbelow and with reference to FIGS. 3A, 3B and 3C. Since a planing craft can operate faster than a displacement hull, the speed of the craft is accordingly increased. At this stage, the tips 24 remain in the same plane as the struts 22.

As the craft increases speed, the foils 12 are moved to their fully extended position, with the tips 24 still in the same plane as the struts 22. At this stage, the full surface of the foils 12 provides lift and the hull 10 lifts partially out of the water. For light craft, the hull 10 might lift completely out the water.

At the end of the transition, the dihedral angle between the tips 24 and the struts 22 is changed thereby allowing the tips 24 to operate as relatively efficient fully submerged foils.

Figure 3B:
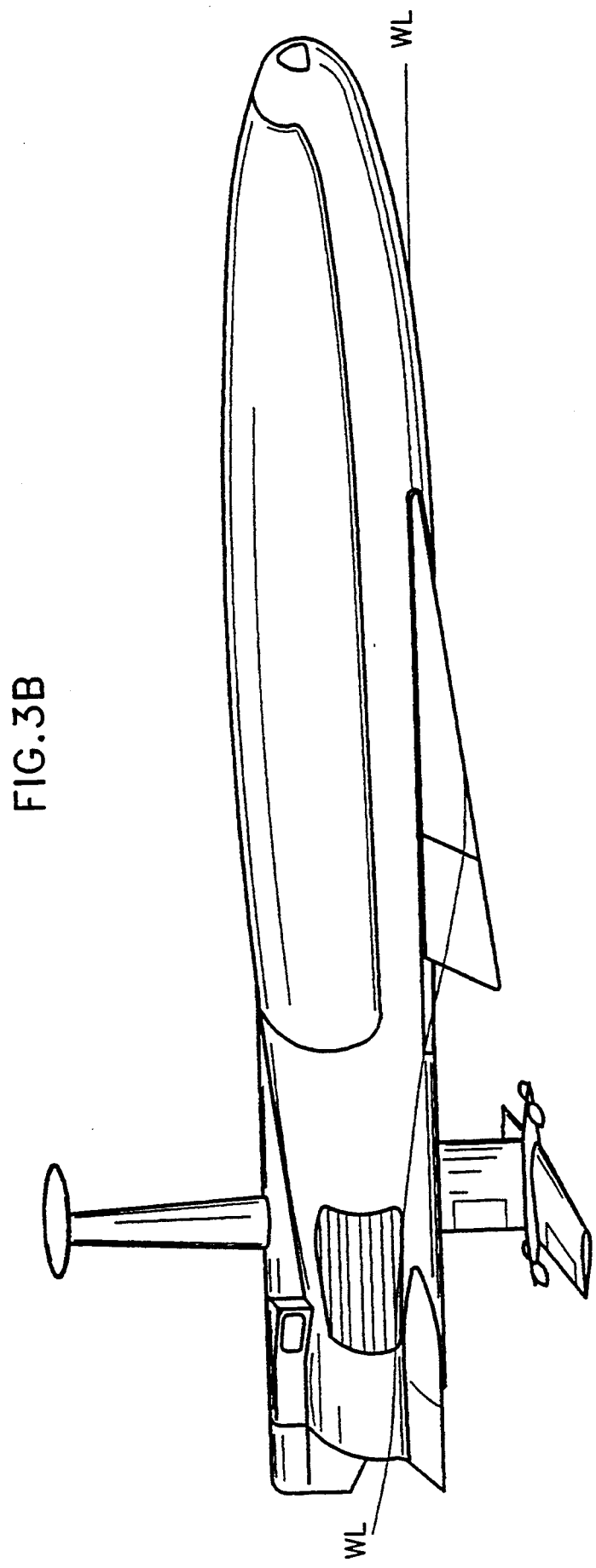
Figure 3C:
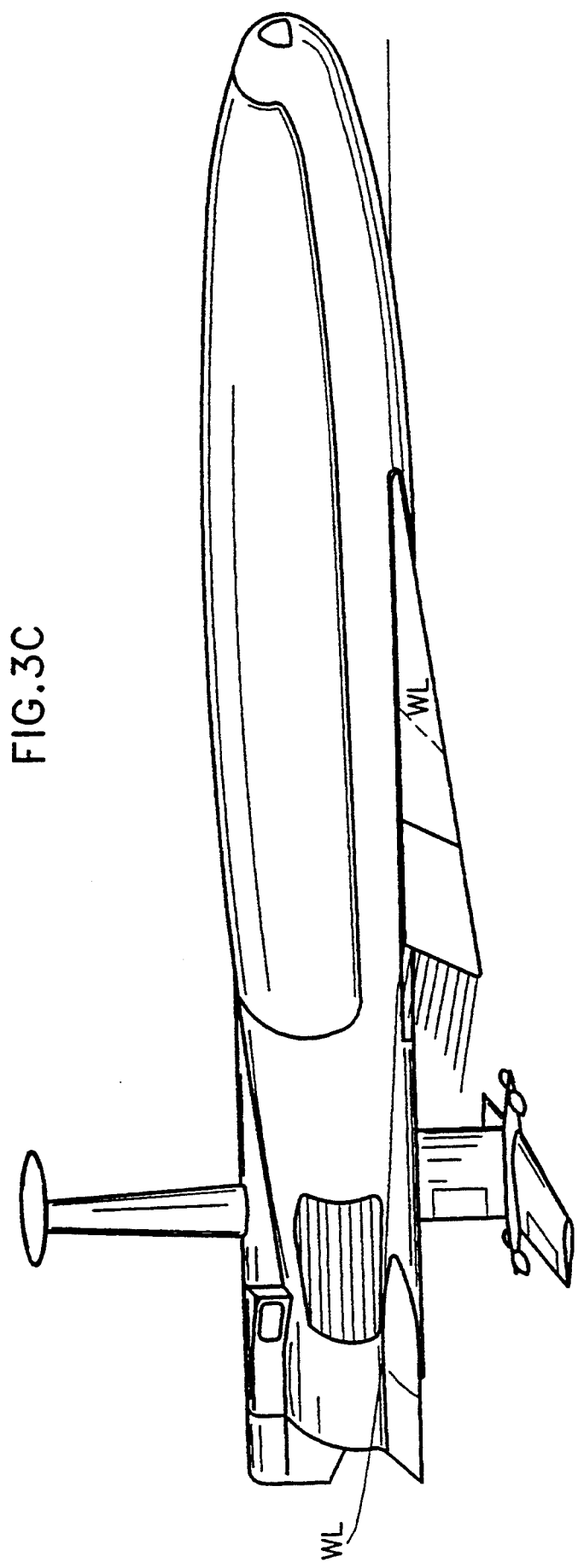
Figure 4A:
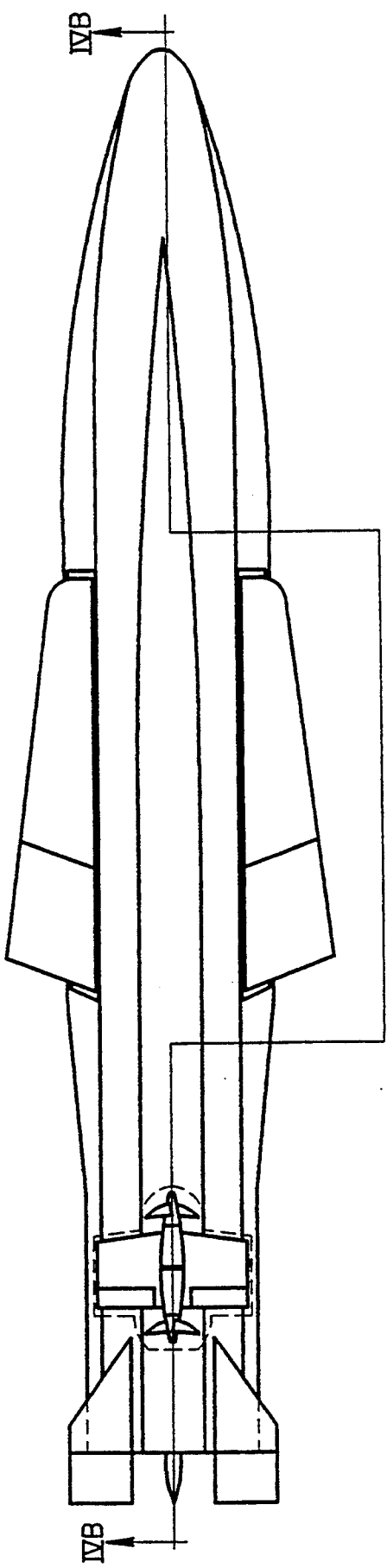
FIG. 4A is a bottom view of the vessel of FIG. 3A, taken along lines IVA—IVA of FIG. 3A.
Figure 4B:
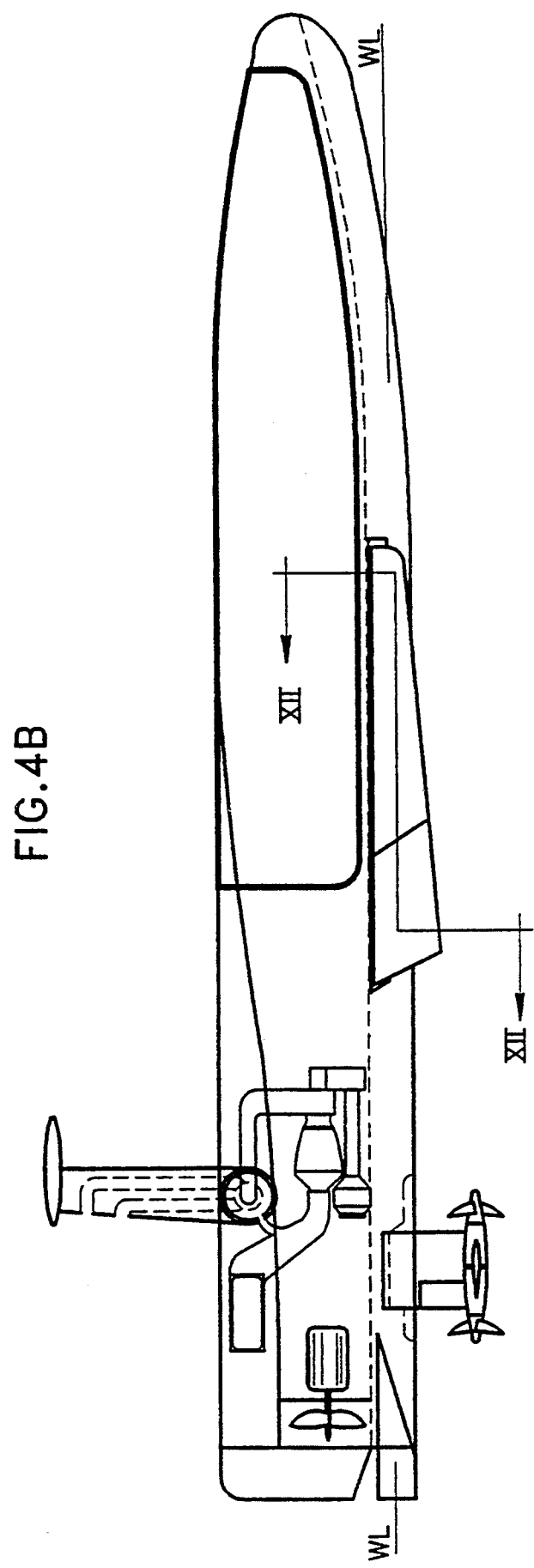
FIG. 4B is a side view of the vessel of FIG. 3A, taken along lines B—B of FIG. 4A.

FIGS. 3A, 3B and 3C illustrate the craft in a planing mode where, as seen in FIG. 3C, most of the hull 10 is above the water and only the lower surface of the foils 12 are in contact with the flow of the wager. FIG. 3B illustrates the planing mode for a craft which is heavier than that of FIG. 3A such that the partially extended forward foils 12 are partially covered by the flowing water. FIG. 3A illustrates the planing mode for a craft heavier than that of FIG. 3B. In FIG. 3A, the water flows generally above most of the surface of foils 12 as well as below the foils 12.

For the planing mode, the forward foils 112 are partially extended from their retracted orientation to an intermediate planing orientation. The tips 24 are in the same plane as the struts 22 and the entirety of each forward foil 12 forms a planing surface. Additional planing surfaces are provided by the shape of the bottom side of the hull 10, described in detail hereinbelow and with reference to FIGS. 12A, 12B, 12C and 12D.

In the planing mode, the rear foil 14 and the mast are fully extended. In accordance with an alternative embodiment of the planing mode of the present invention, the rear foil 14 is partially retracted.

In the planing mode of FIG. 3A, the water flows on the majority of the upper surface of the forward foils 12, as well as underneath the foils 12. Thus, the foils operate as long chord foils. In the planing mode of FIG. 3B, the water flows partially on the upper surface of the foils 12. The portion of the foils 12 thus covered with water operate as long chord foils and the remaining portions operate as planing surfaces. In the planing mode of FIG. 3C, the water flows only on the underside of the foils 12 and thus, the foils 12 operate as planing surfaces.

FIG. 5 illustrates a partially submerged mode where the mast 16 is partially submerged. The forward foils 12 are fully retracted but the mast 16 and the rear foil 14 are fully extended. In this mode, the craft can be mostly hidden and can utilize the detectors on detector dish 18 to detect other crafts in its vicinity.

Figure 6A:
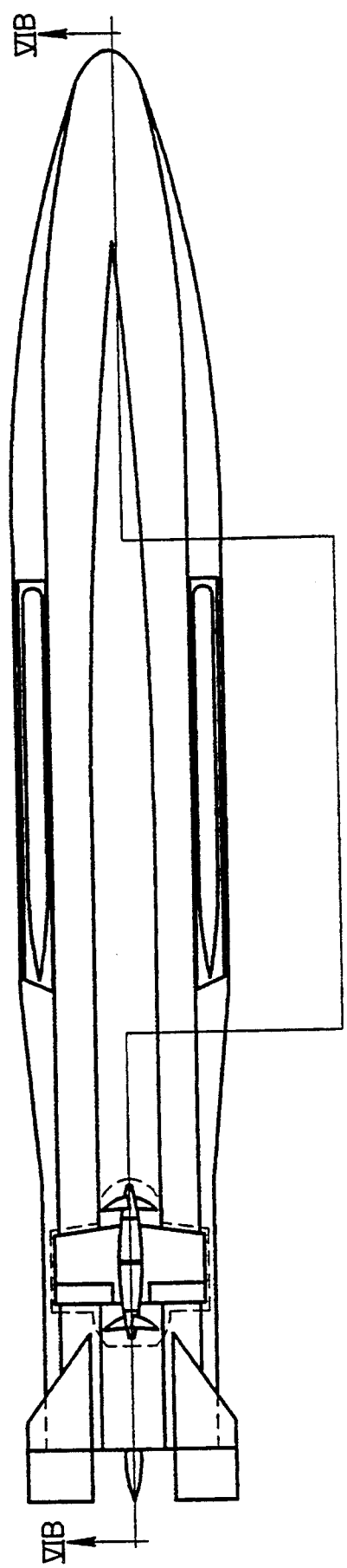
FIG. 6A is a bottom view of the vessel of FIG. 5, taken along lines VIA—VIA of FIG. 5.
Figure 6B:
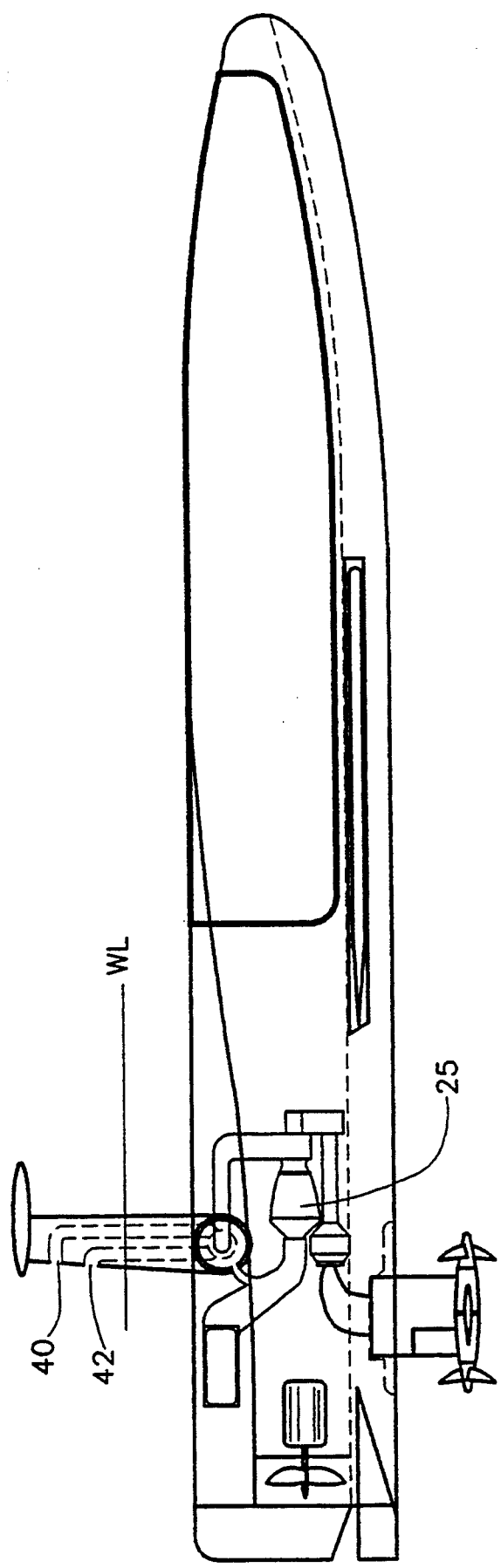
FIG. 6B is a side view of the vessel of FIG. 5, taken along lines B—B of FIG. 6A.

In the above water line modes of planing and hydrofoil, as shown in FIGS. 1A and 3, the power for propulsion is provided by a first propulsion system comprising turbines 25 (FIG. 6B). Air is provided to turbines 25 via air intake inlets 26, located on both sides of an upper fin 28 (only one is visible in FIG. 5). In the partially submerged mode of FIG. 5, air intake inlets 26 are closed and air is taken in and exhaust is removed through air inlet 40 and exhaust outlet 42 (FIG. 6B), respectively, located in the mast 16. Exhaust can, alternatively, be removed through the water.

As in the planing mode of FIG. 3, the rear foil 14 and the mast 16 are fully extended.

Figure 7A:
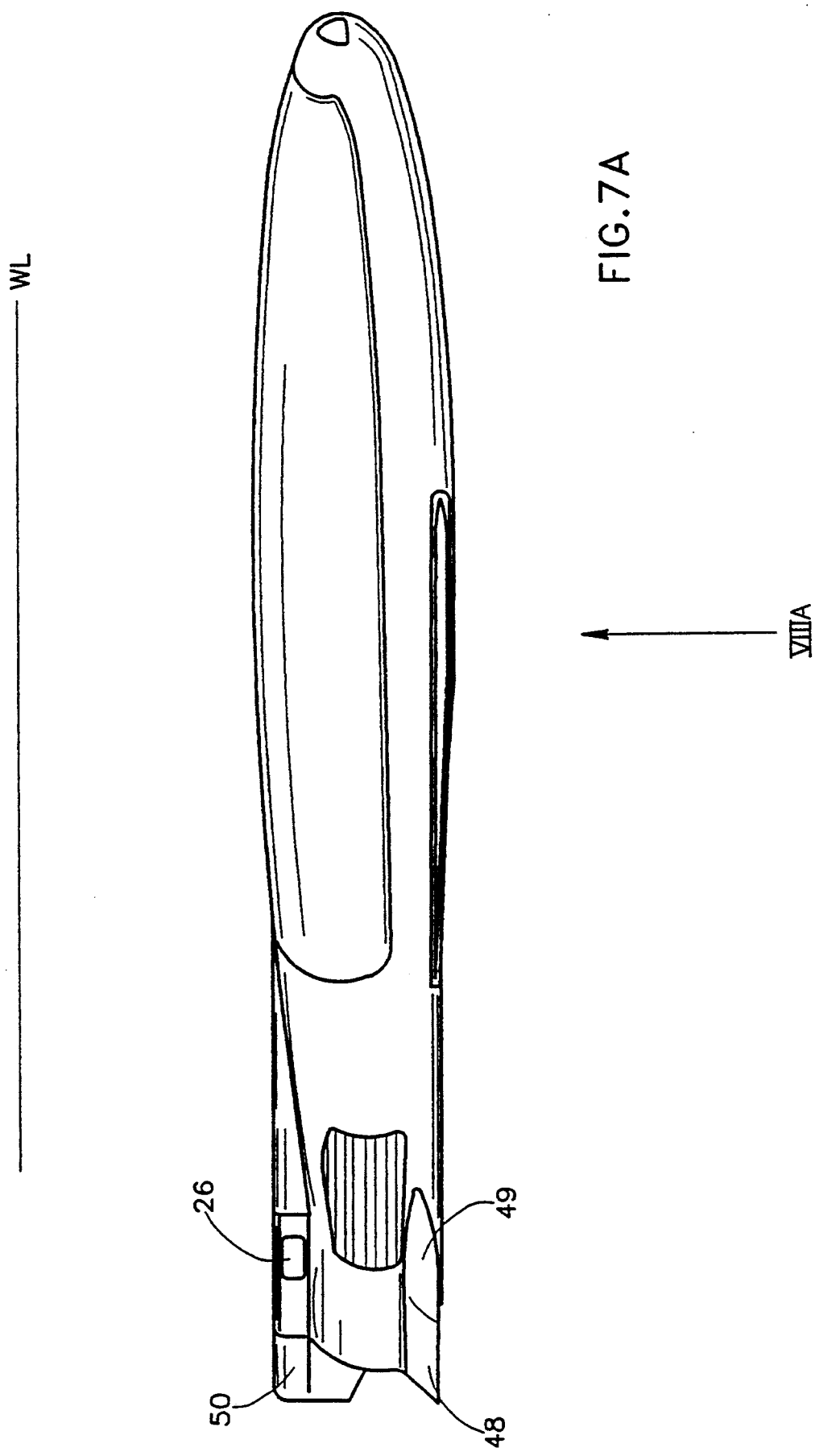
FIGS. 7A and 7B are pictorial illustrations of the vessel of FIG. 1 in two undersea mode orientation.
Figure 7B:
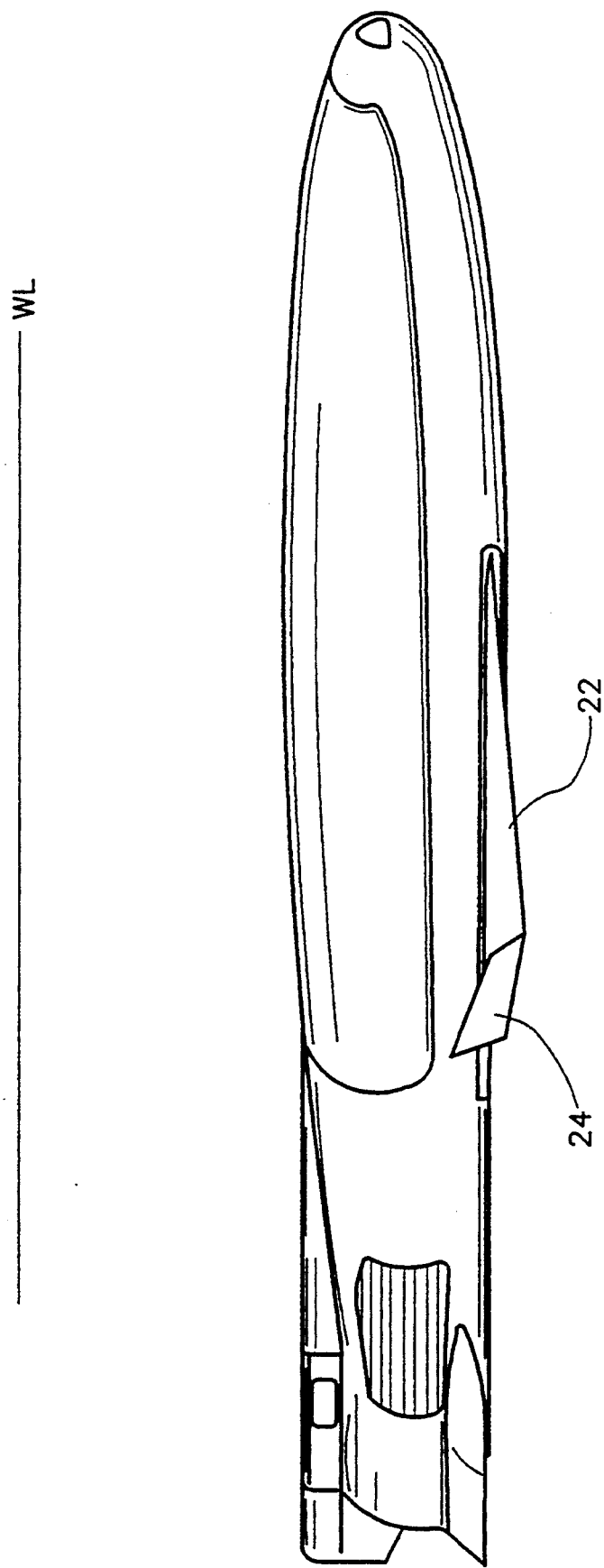

FIGS. 7A and 7B illustrate the craft in two undersea modes. In the mode of FIG. 7A, the forward foils 12, the rear foil 14 and the mast 16 are fully retracted and air inlets 26 are closed. The resultant craft is streamlined for low resistance travel undersea. Propulsion is provided by a second propulsion system comprising an electric motor 44 (FIG. 8B) typically operating in conjunction with a propeller 46 (FIG. 8B), such as a fixed or a variable pitch propeller.

Pitch steering is provided by two undersea control surfaces 48, attached to side fins 49, and by an undersea rudder 50. Surfaces 48 provide roll and pitch movement and rudder 50 provides directional steering.

In the alternative undersea mode of FIG. 7B, the forward foils 12 are partially extended while the rear foil 14 and the mast 16 are fully retracted and air inlets 26 are closed. The forward foils 12 are partially extended to the point that the tips 24 are completely out of the hull and can rotate with respect to the struts 22. In this manner, the tips 24 can act as additional control surfaces.

In accordance with a preferred embodiment of the present invention, propulsion and steering for the hydrofoil, planing, and partially submerged modes are provided by the rear foil 14. The rear foil 14 typically comprises two counter-rotating propellers 52 for propelling the sea craft and a rear strut 54 to which is attached a rudder 56 for steering and foils 58 for providing lift to the aft portion of the craft. Control surfaces 60 (FIG. 2A), attached to foils 58, provide pitch and roll control to the craft.

Figure 1B:
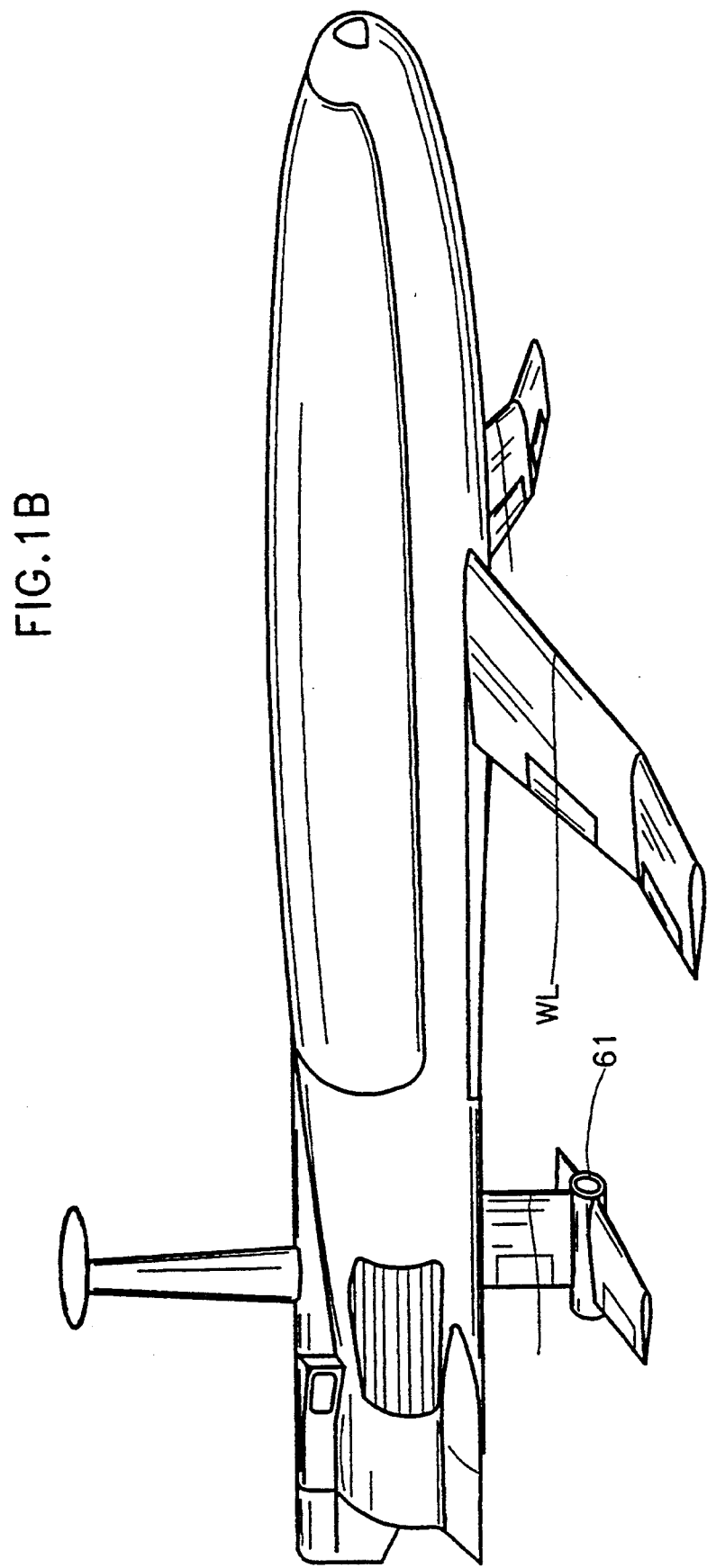
FIG. 1B is a pictorial illustration of an alternative embodiment of the vessel of FIG. 1A.

In accordance with an alternative embodiment of the present invention, as shown in FIG. 1B, propellers 52 of the read foil 14 are replaced by a water jet 61, such as Jacuzzi jets.

Figure 2A:
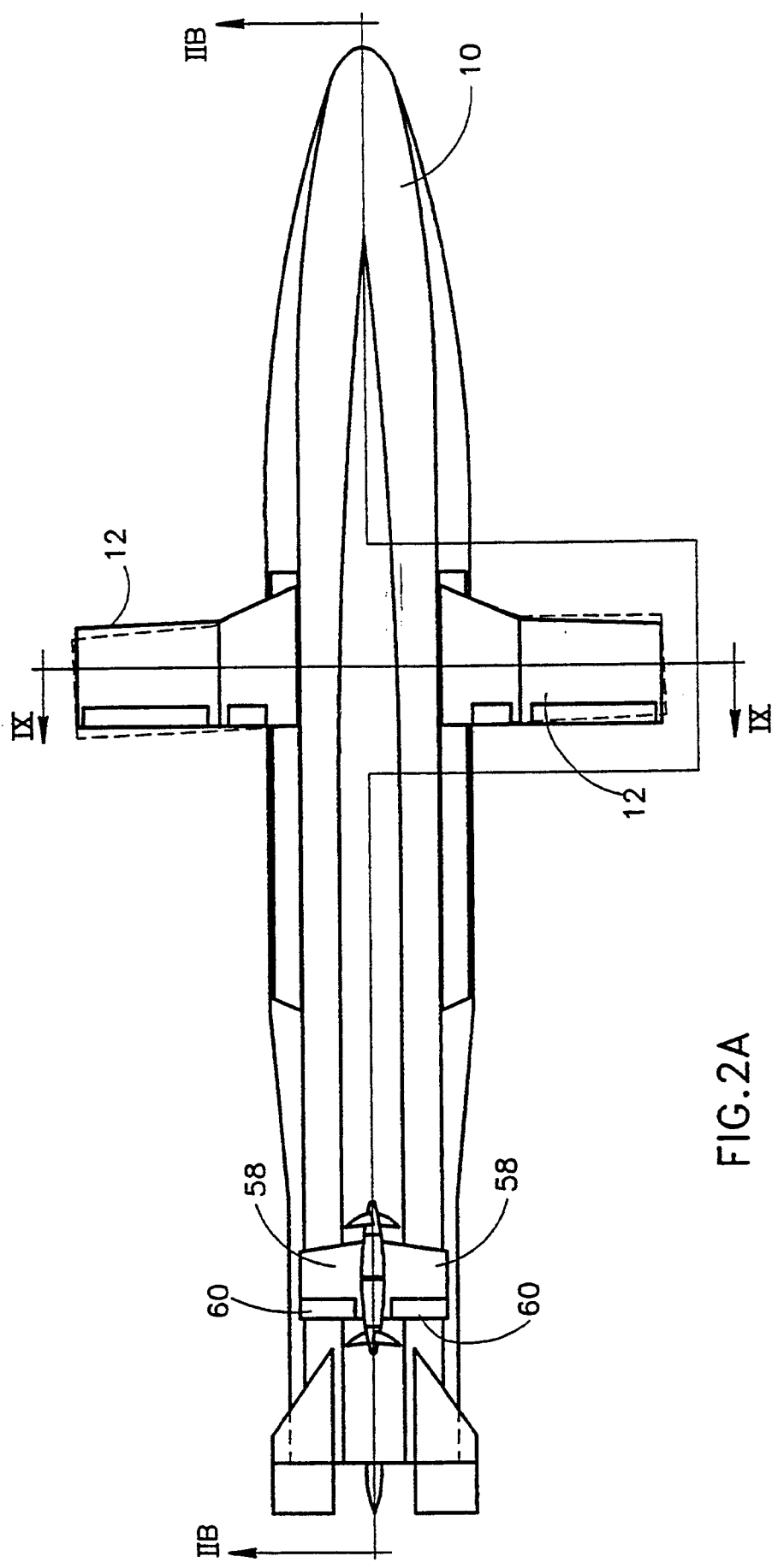
FIG. 2A is a bottom view of the vessel of FIG. 1, taken along lines IIA—IIA of FIG. 1.
Figure 2B:
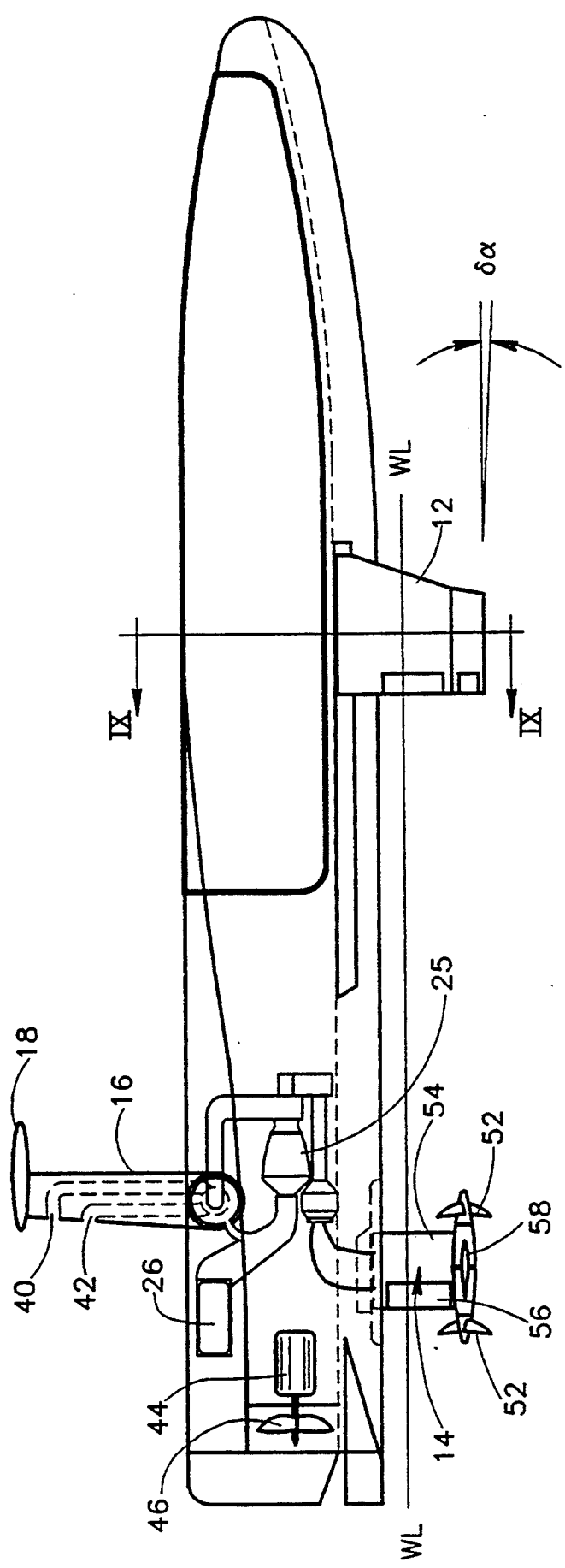
FIG. 2B its a side view of the vessel of FIG. 1, taken along lines B—B of FIG. 2A.
Figure 8A:
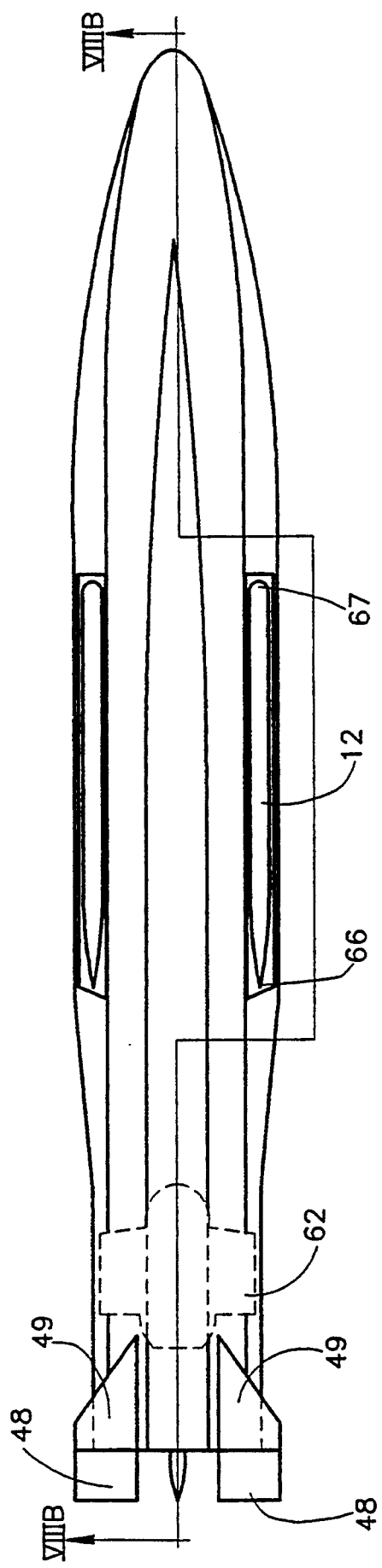
FIG. 8A is a bottom view of the vessel of FIG. 7A, taken along lines VIIIA—VIIIA of FIG. 7A.
Figure 8B:
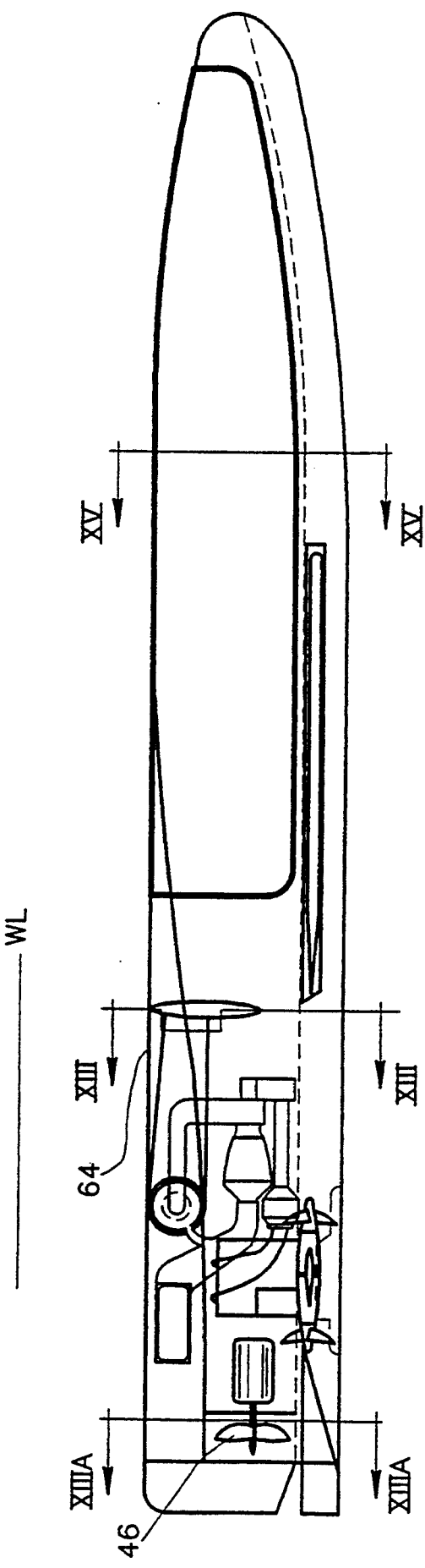
FIG. 8B is a side view of the vessel of FIG. 7A, taken along lines B—B of FIG. 8A.

As mentioned hereinabove, FIGS. 2A and 2B show the top and bottom views of the craft in the hydrofoil mode orientation. The two propulsion systems of the craft can be clearly seen in FIG. 2B. FIGS. 4A, 4B, 6A, 6B, 8A and 8B show the craft with the mast 16, reap foil 14 and the forward foils 12 in their various positions. It will be noted that FIG. 8A shows a cover 62 over the retracted rear foil 14 and FIG. 8B shows a cover 64 over retracted mast 16. Covers 62 and 64 are typically sliding doors and are necessary for keeping the water out of the craft when it is in an undersea mode. Rubber gaskets 66 which fill an opening 67 in which are located Forward foils 12 serve the same purpose.

Referring back to FIGS. 2A and 2B, it will be seen that it is possible to bank the craft by slightly pivoting forwards one forward Foil 12 from its fully extended position and by slightly pivoting backwards the second forward foil 12 from its fully extended position. Because the forward foils 12 are angled with respect to the hull 10 and because they retract and extend via rotation, as shown in more detail hereinbelow and with reference to FIG. 10, the angle of attack of the forward foils 12 are respectively increased or decreased as they are extended or retracted. Thus, a banking effect is produced in the craft when the Forward foils 12 are not in the same location with respect to the hull. For example, in FIG. 2A, the port Foil 12 is slightly extended and the starboard foil 12 is slightly retracted, thus banking the craft to the right. The increase in angle of attack in the starboard foil 12 is noted on FIG. 2B as sa.

Figure 9:
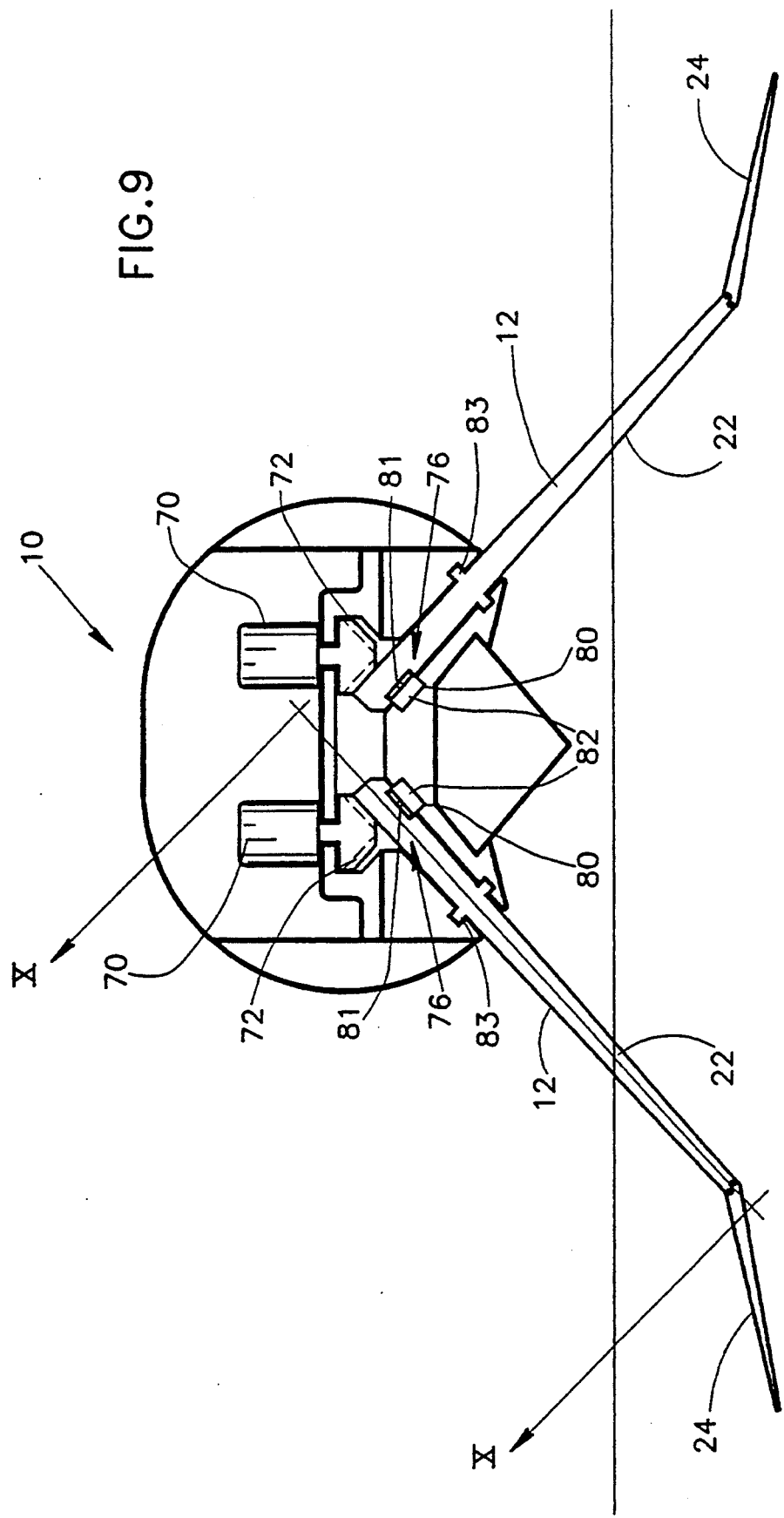
FIG. 9 is a cross-section, taken along lines IX—IX of FIG. 2B, illustrating hydrofoil apparatus for the vessel of FIGS. 1 and 2 in accordance with one preferred embodiment of the invention.

Reference is now made to FIGS. 9, 10, 11A and 11B. It will be appreciated that the banking described hereinabove, requires that each forward foil 12 be individually operable. This requirement is fulfilled, as shown in FIG. 9, with two motors 70, one for each forward foil 12.

Each motor 70 rotates a beveled gear 72 which, accordingly, rolls along a curved toothed track 74 (FIG. 10) embedded into each of the forward foils 12, thereby rotating each foil 12 about a diagonal axis 83. The rotation of each foil 12 produces either retraction or extension of the foil 12 from the hull 10.

Below each foil 12 is a counter support system 76 for supporting the foil 12 and for maintaining the tolerance between the beveled gear 72 and the teeth of the track 74. The counter support system 76 comprises a recess 81 located directly below the track 74 on the underside of the foil 12 and bearings 82 fixed to the hull 10 inside a seat 80 and directed to the recess 81. Recess 81 is in the shape of track 74.

As the foil 12 rotates in accordance with the rotation of the beveled gear 72, the bearings 82 move inside recess 80 and keep the foil snug to the beveled gear 72. Thus, the counter support system ensures that the foil 12 follows track 74.

It will be appreciated that the counter support system 76 is necessary to reduce the deflection of foil 12 due to the levered force of the water on the tip 24 which can cause the curved track 74 not to properly engage the beveled gear 72.

Figure 10:
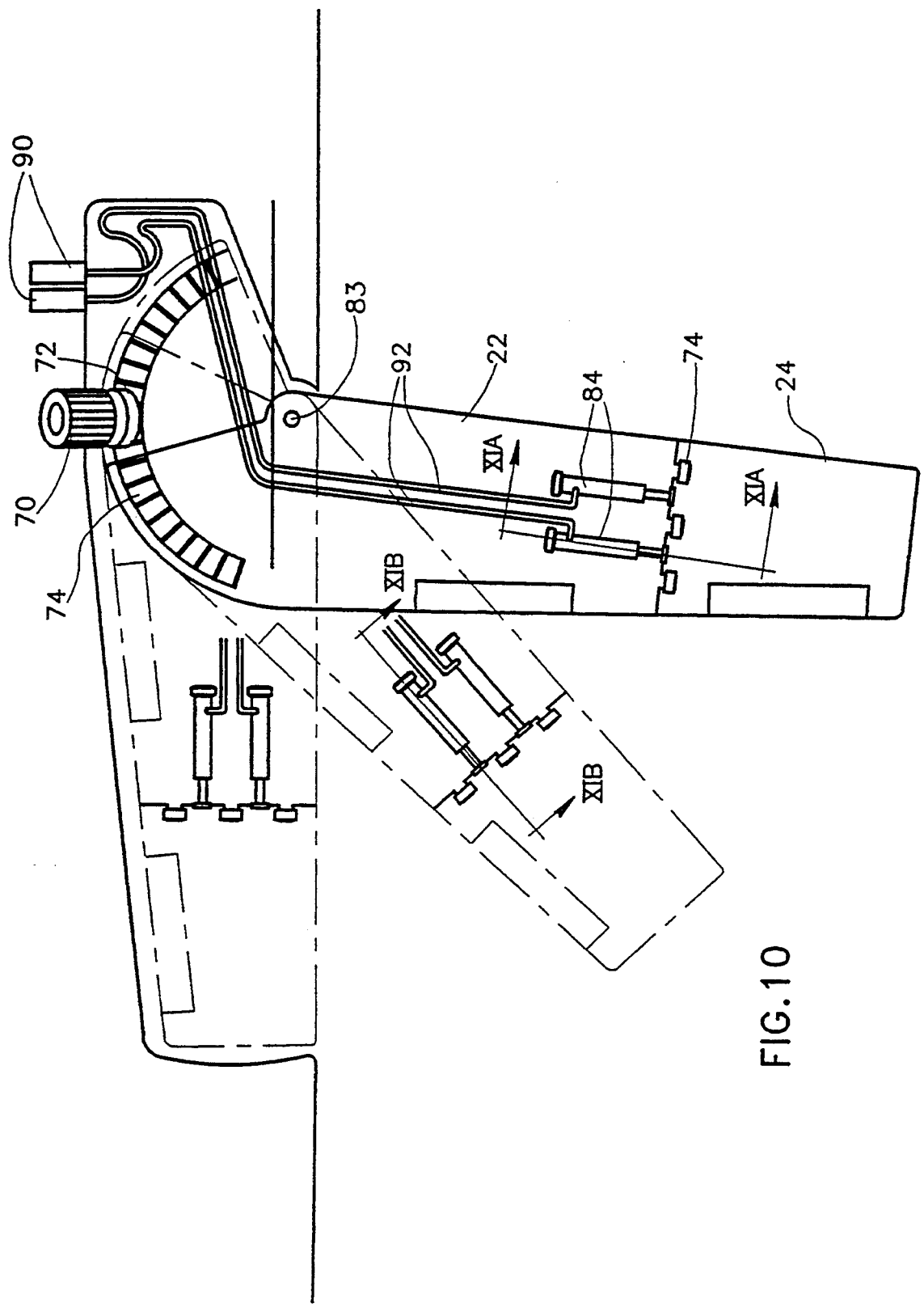
FIG. 10 is a diagonal section, taken along lines X—X of FIG. 9, illustrating retraction of the hydrofoil apparatus of FIG. 9.

FIG. 10 shows one foil 12 as it rotates in accordance with the movement of the gear 72 about an axis 84. In location A, the foil 12, marked with a solid line, is in an extended position typical for the hydrofoil mode. The tip 24 is bent at a dihedral angle B (FIG. 11) from the line defined by the strut 22. When the foil 12 is retracted, the tip 24 is first straightened to the location shown in locations B and C. Location B is an intermediate location, somewhat further out than that for the planing mode of operation of the craft, and location C is a fully retracted location, typical for the undersea mode.

The angle B, as mentioned hereinabove, enables the tip 24 to be generally parallel to the surface of the water. In accordance with a preferred embodiment of the present invention, during banking, the angle B of each tip 24 is set to a different value so as to maintain proper lift during the banking maneuver. For the forwardly pivoted foil 12, angle B is increased and for the backwardly pivoted foil, B is decreased.

Additionally, the angle B is changed during the banking period. Typically, an initial value of B will be chosen as the craft begins the banking maneuver. The value of B will be continuously changed throughout the maneuver until the craft pulls out of the maneuver.

Figure 11A:
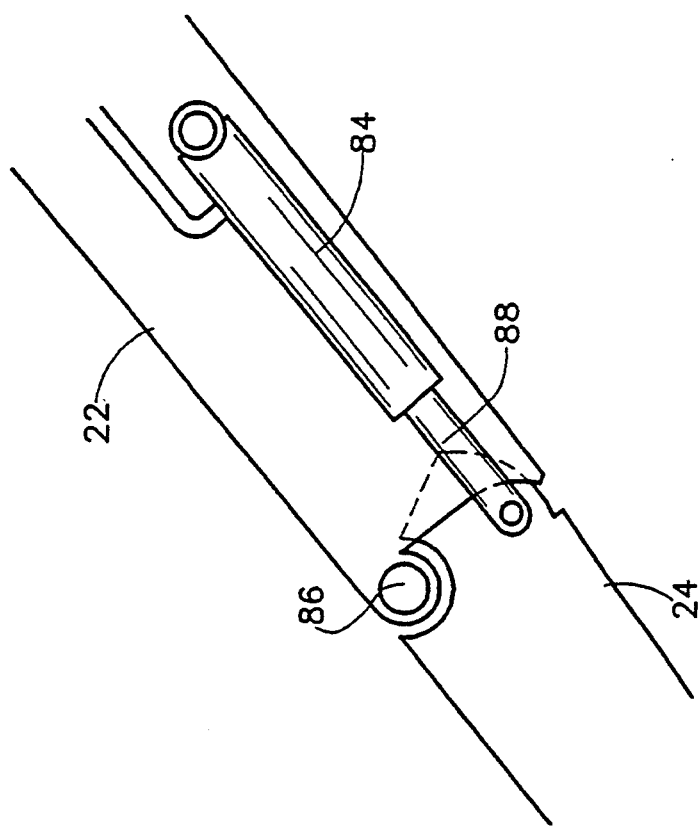
FIGS. 11A and 11B are sectional illustrations taken along lines XIA—XIA and XIB—XIB of FIG. 10.
Figure 11B:
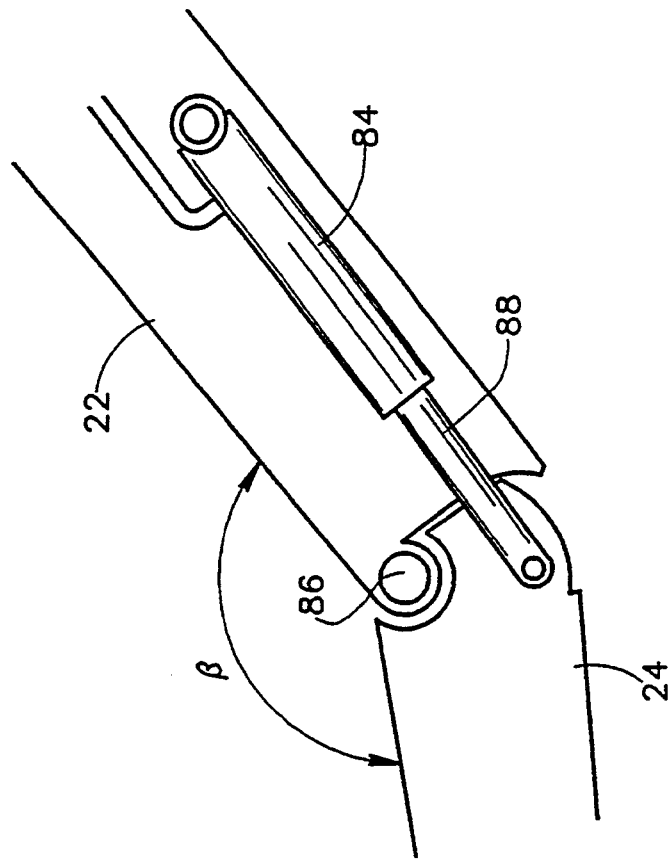

The angle B is typically achieved via the action of hydraulic pistons 84 (FIG. 10) attached to strut 22 and eccentrically operating on a hinge 86. FIGS. 11A and 11B show the operation of one of the pistons 84. A rod 88 of the piston 84 is attached to tip 24 at a location below that of the hinge 86. As the rod 88 extends and retracts, tip 24 is accordingly straightened and rotated.

Pistons 84 operate in accordance with commands from a command center (not shown) which indicates to hydraulic pumps 90 (FIG. 10) to increase or decrease the supply of an hydraulic fluid, such as oil, in hydraulic pipes 92 thereby respectively extending or retracting rod 88.

Figure 12A:
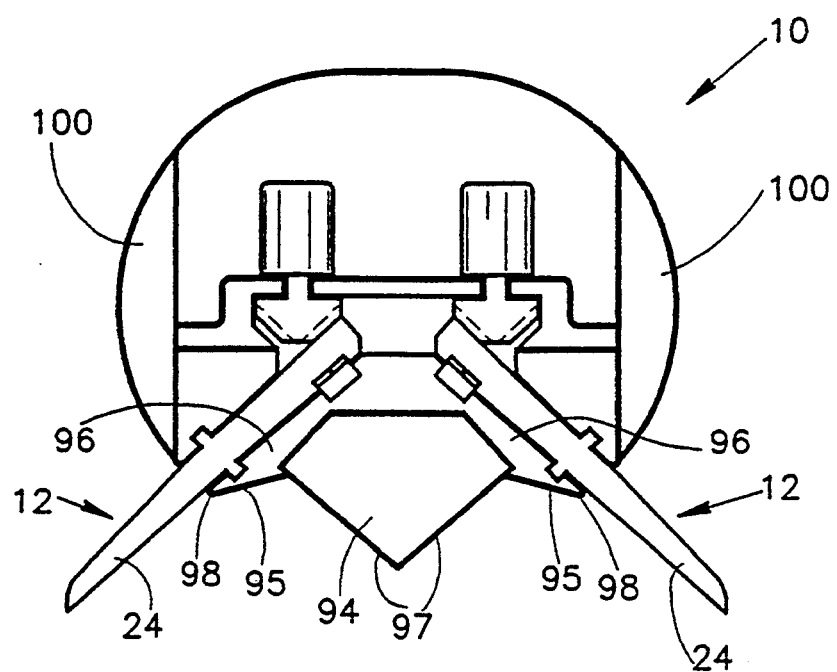
FIGS. 12A, 12B, 12C and 12D are front section illustrations taken along the lines XII—XII of FIG. 4B and illustrating four embodiments of hull cross sections.

Reference is now made to FIGS. 12A–12D which illustrate four possible hull cross sections. In accordance with a preferred embodiment of the present invention, hull 10 has a cathedral planing hull cross-section, as shown in FIG. 12A. As can be seen, it is a multi-prismatic hull, comprising a central prism-shaped hull element 94 and two side hull elements 96 with keels 98 out of which extend the forward foils 12. The central hull element 94 has planing surfaces 97 and the side hull elements 96 have planing surfaces 95. Thus, the multi-prismatic hull has four planing surfaces making it a relatively efficient hull shape for planing.

Figure 12B:
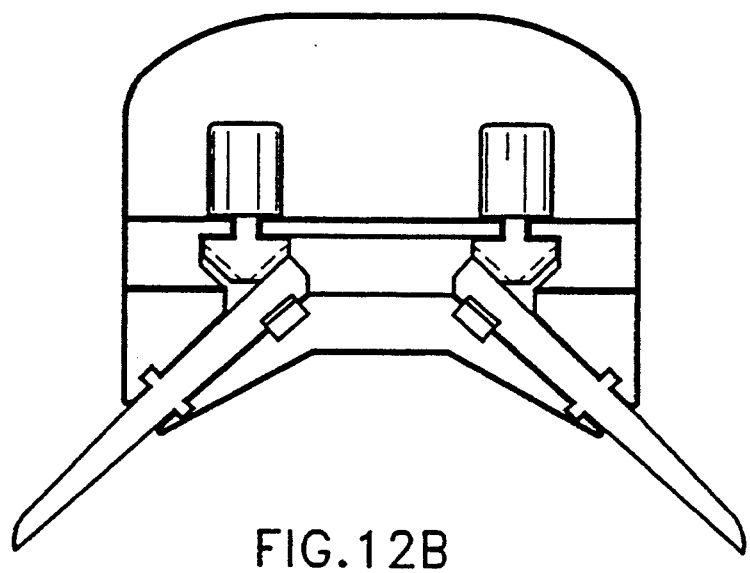
Figure 12C:
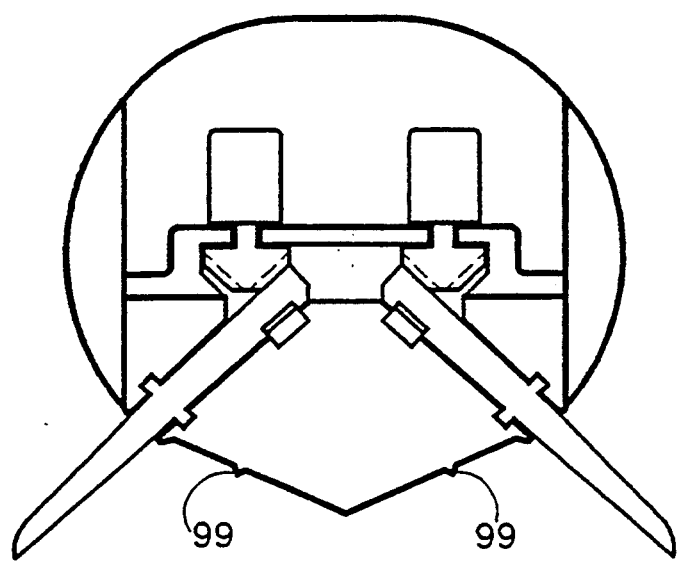
Figure 12D:
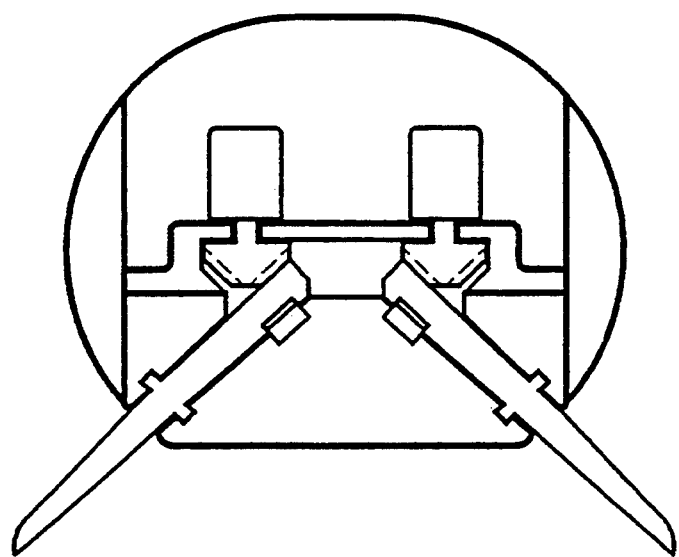

FIG. 12B illustrates an alternative embodiment of the present invention where the hull cross-section is in a catamaran configuration. In accordance with a second alternative embodiment of the present invention, and as shown in FIG. 12C, the hull cross-section is a deep V planing configuration with longitudinal strakes 99. In accordance with a third alternative embodiment of the present invention and as shown in FIG. 12D, the hull has a flat bottom which can operate as both a planing bottom and as a displacement hull.

It is a feature of the invention that the shape of the hull 10 in conjunction with the forward foils 12 is relatively efficient For the hydrofoil, planing and undersea orientations.

As is known in the art, a craft specifically designed for surface performance is shaped in a way which compromises its efficiency if submerged. For instance, planing hulls produce desirable surface performance. The deep V cross section fitted with longitudinal strakes, shown in FIG. 12C, is particularly efficient in rough water. However, a high lift planing bottom requires a wide beam which is inconsistent with a requirement of a narrow hull for undersea operation.

The conventional undersea hull shape is a cigarette shaped hull. It provides efficient undersea operation but provides inefficient operation as a surface craft. As a surface craft, the cigarette shaped hull typically operates as a displacement hull not capable of high speeds or as a very narrow bottom planing hull which typically does not provide enough lift to produce high speeds.

It will be appreciated that the craft of the present invention is configured to relatively efficiently operate as both as surface craft and as a submerged craft. The narrow cigarette shaped hull is fitted with completely retractable forward foils 12. When operating as a surface craft, the forward foils 12 carry the majority of the weight of the craft, assisted by a narrow planing bottom. This eliminates the drawback of the narrow hull operating as a displacement hull when operated as a surface craft. Moreover, in the undersea mode, the forward foils 12 are retracted leaving a craft with a narrow hull which is efficient for undersea operations.

Reference is made back to FIGS. 12A–12D. In accordance with the preferred embodiment of the present invention, the voids in the hull are utilized for storage. The central prism-shaped hull element 94 provides a storage space for batteries utilized for providing power to the electric motor 44. The side hull elements 96 provide storage for fuel or the turbines 25. Additional fuel, typically for long voyages, can be stored in inflatable tanks 100, typically formed of rubber membranes, such as Neoprene (TM). The inflatable tanks 100 preferably remain flat against the sides of the hull 10 during short voyages when no fuel is stored there.

The rubber membranes are typically bonded to the hull with a sticky substance such as glue. Additionally, the rubber membranes are fastened to the hull 10 with rigid metal strips.

It will be appreciated that FIGS. 12A–12D illustrate the hull cross-section of the craft in the planing mode orientation of FIG. 3. As was shown in FIG. 3, in the planing mode, the forward foils 12 are partially retracted and the tips 24 are straight with respect to the struts 22. Thus, the forward foils 12 present a long chord to the movement of the water below them. This long chord is a relatively efficient planing surface and produces lift.

Figure 13:
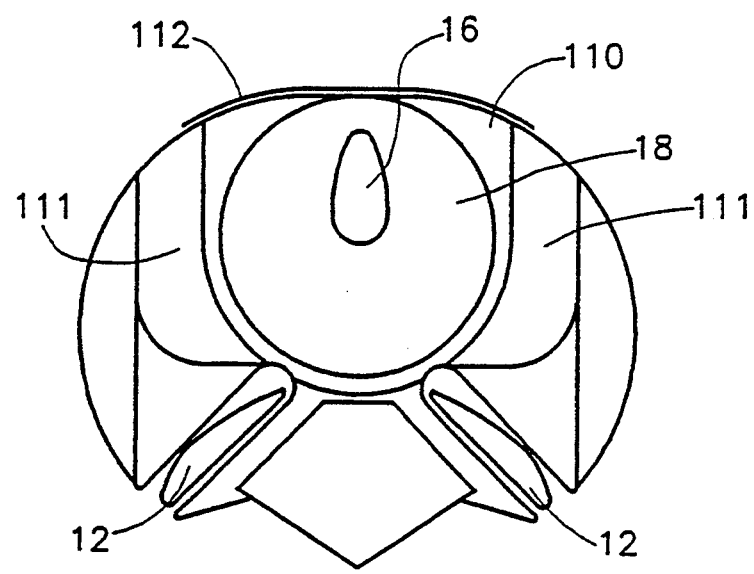
FIG. 13 is a front section illustration taken along the lines XIII—XIII of FIG. 8B.

Reference is now made to FIG. 13 which is a cross-section of the hull in the area near the end of the opening 67 for the craft in the undersea mode of FIG. 7. The forward foils 12 are completely retracted, as is mast 16. As can be seen in FIG. 13, the mast 16 and the detector dish 18 are retracted into a compartment 110. Compartment 110 is typically closed in the undersea mode, via sliding doors 112. Additionally, compartment 110 is typically filled with flotation devices 111 in the voids around the retracted mast 16.

Figure 14:
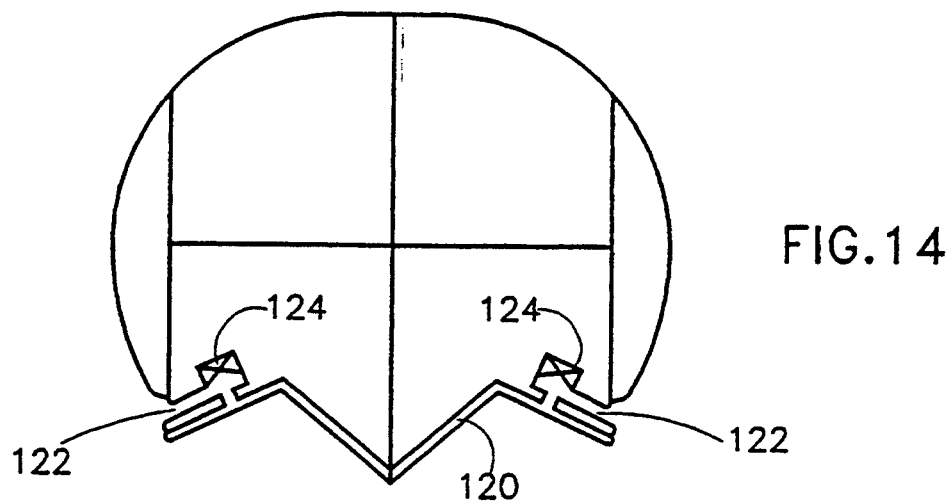
FIG. 14 is a front section illustration of a mechanism for producing an inflatably rounded hull useful in the embodiment of FIG. 7A.
Figure 15:
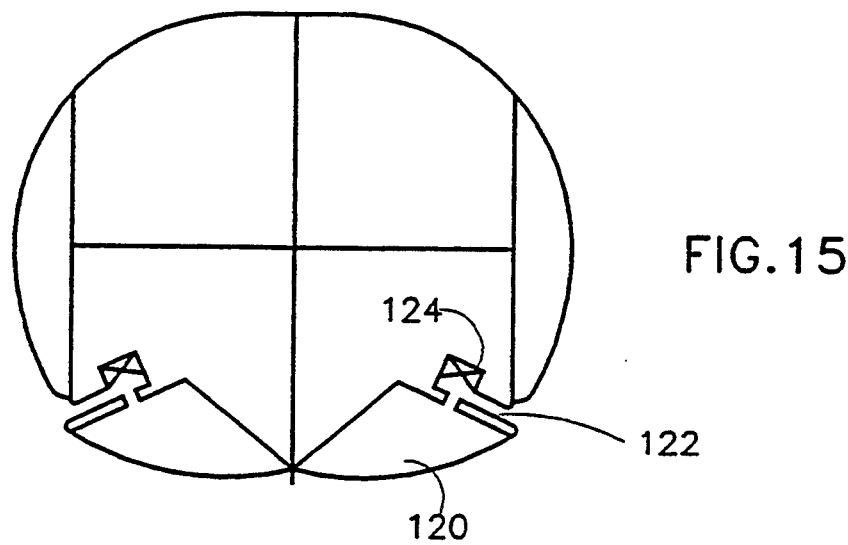
FIG. 15 is a front section illustration taken along the lines XV—XV of FIG. 8B which illustrates the inflatably rounded hull produced by the mechanism of FIG. 14 for operation in the undersea mode.

Reference is now made to FIGS. 14 and 15 which illustrate apparatus for streamlining the hull of the craft for the undersea mode of operation. A flexible membrane 120, such as of rubber, is preferably attached to most of the hull of the craft in the manner described hereinabove with reference to inflatable tanks 100. A multiplicity of water inlets 122 are located above the flexible membrane at a multiplicity of locations along the hull of the craft and associated with each water inlet 122 is a water pump 124. Upon commands from the command center (not shown), the water pumps 124 pump water from the inlets 122 into the flexible membrane 120, thus inflating the membrane 120 until it achieves the more streamlined position shown in FIG. 15. Once the membrane 120 achieves the desired state, the water pumps 124 cease pumping and act as valves to prevent water Flowing into or out of the inflated membrane 120.

Upon suitable commands from the command center, typically in preparation for operation in a non-submerged mode, the water pumps 124 pump the water out of the flexible membrane 120 thus deflating the membrane 120 which subsequently adheres to the surface of hull.

Figure 16:
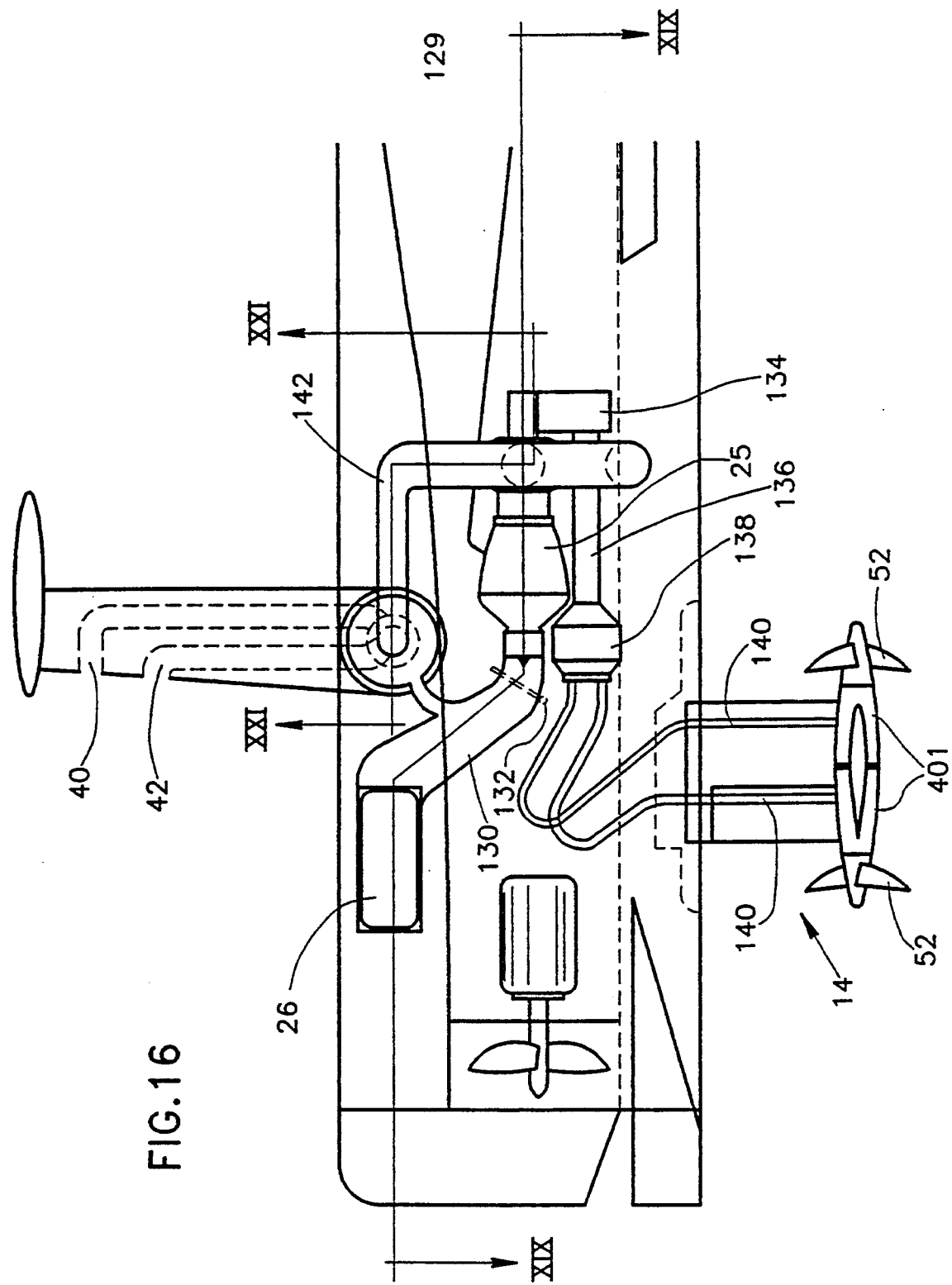
FIG. 16 is a side section illustration of the operation of a propulsion system useful in the embodiments of FIGS. 1, 3 and 5.

Reference is now made to FIGS. 16–19 which illustrate elements of the two propulsion systems. The first propulsion system typically comprises two turbines 25 (only one is shown in FIG. 16) which receive air from air intake inlets 26 during hydrofoil and planing operations and from air intake inlet 40 during partially submerged operations. Additionally, turbines 25 receive fuel from a fuel line 129 attached to fuel storing side hull elements 96 (not shown in FIGS. 16–19).

The air from any of the air intake inlets 26 and 40 passes via air duct 130 to filters 132, such as the Centrisep Air Cleaner/Mist Eliminator System by Aircraft Pourous Media, Inc of Glen Cove, N.Y. of USA located in front of each turbine 25. The filters 132 filter water spray and salt from the air and ensure that only clean air arrives at the turbines 25.

Each turbine 25 combusts fuel with air. The power take off stage of each turbine 25 drives a gear 134 which transmits power through an axle 136. The rotation of axle 136 operates an hydraulic pump 138 which causes hydraulic fluid in hydraulic pipes 140 to flow and to cause motors 401 to turn. The motors turn propellers 52 which propel the craft forward. Exhaust gases from the turbines 25 is discharged through an exhaust manifold 142 to air outlet 42.

It will be understood that propellers 52 rotate counter rotatively. As is known in the art, counter rotative rotation between two propellers achieves a relatively efficient propulsion. To produce movement in the reverse direction, each propeller 52 is rotated in the reverse direction.

The second propulsion system comprises electric motor 44 and propeller 46. The electric motor 44 is Fun through power supplied by batteries stored in hull element 94 (FIG. 9). It will be appreciated that the second propulsion system is relatively quiet since no combustion is occurring. This quiet propulsion system is advantageous since it enables the crew of the craft to be more comfortable during the undersea operations. Additionally, the electric propulsion system has no exhaust gases and therefore, can be easily operated undersea.

Figure 17:
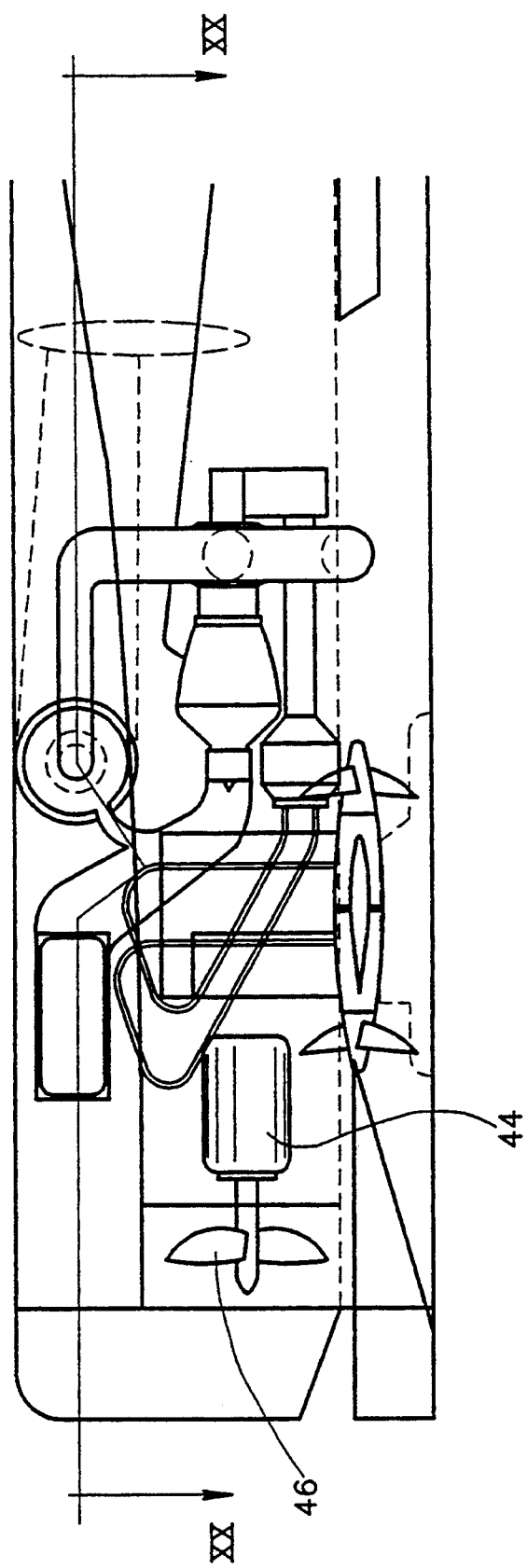
FIG. 17 is a side section illustration of the system of FIG. 16 in an undersea mode orientation useful in the embodiment of FIG. 7A.

It will be appreciated that the elements of the two propulsion systems are located, as shown in FIG. 17, such that retraction can be easily performed. Thus, the hydraulic pipes 140 are typically flexible pipes, such as those made of rubber or plastic, which move easily during retraction and extension of rear foil 14.

Figure 18B:
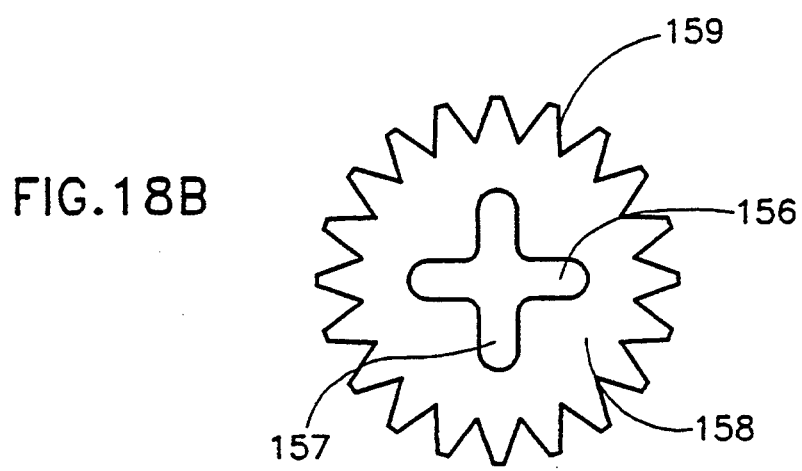
FIG. 18B is a sectional illustration taken along lines XVIIIB—XVIIIB of FIG. 18A.

FIG. 18A pictorially illustrates an alternative embodiment of the first propulsion system. In this alternative embodiment, the rear foil 14 is mechanically retracted and extended. Turbines 25 rotate reduction gears 150 which, in turn, turn geared power rods 152. As geared power rods 152 turn, they turn gears (not shown) which turn the propellers 52.

Each propeller 52 is turned by a 90° gear system (not shown) built into casing 404 and powered by geared power rods 152. Power rods 152 have outer teeth 156 which are driven by a cross shaped recess 157 of a spur gear 158. Spur gear 158 additionally has outer teeth 159 which are turned by reduction gear 150, which, as mentioned hereinabove, is powered by one turbine 25.

A rear foil retraction and extension system is comprised of a motor 402 for turning a pinion 403. Pinion 403 moves a toothed rack 405 which is part of rear foil strut 54. As pinion 403 moves toothed rack 405, rear foil strut 54 retracts and extends. During retraction or extension, geared power rods 152 slide inside the cross-shaped recess 157 of spur gear 158, continuously providing power to the propellers 52 regardless the elevation of the rear foil 14.

FIG. 18A additionally illustrates the location of the electric motor 44 with respect to the alternative first propulsion system. Also seen in FIG. 18A are batteries 165, such as silver cell or lead batteries, stored in hull element 94, used for powering electric motor 44.

Figure 19:
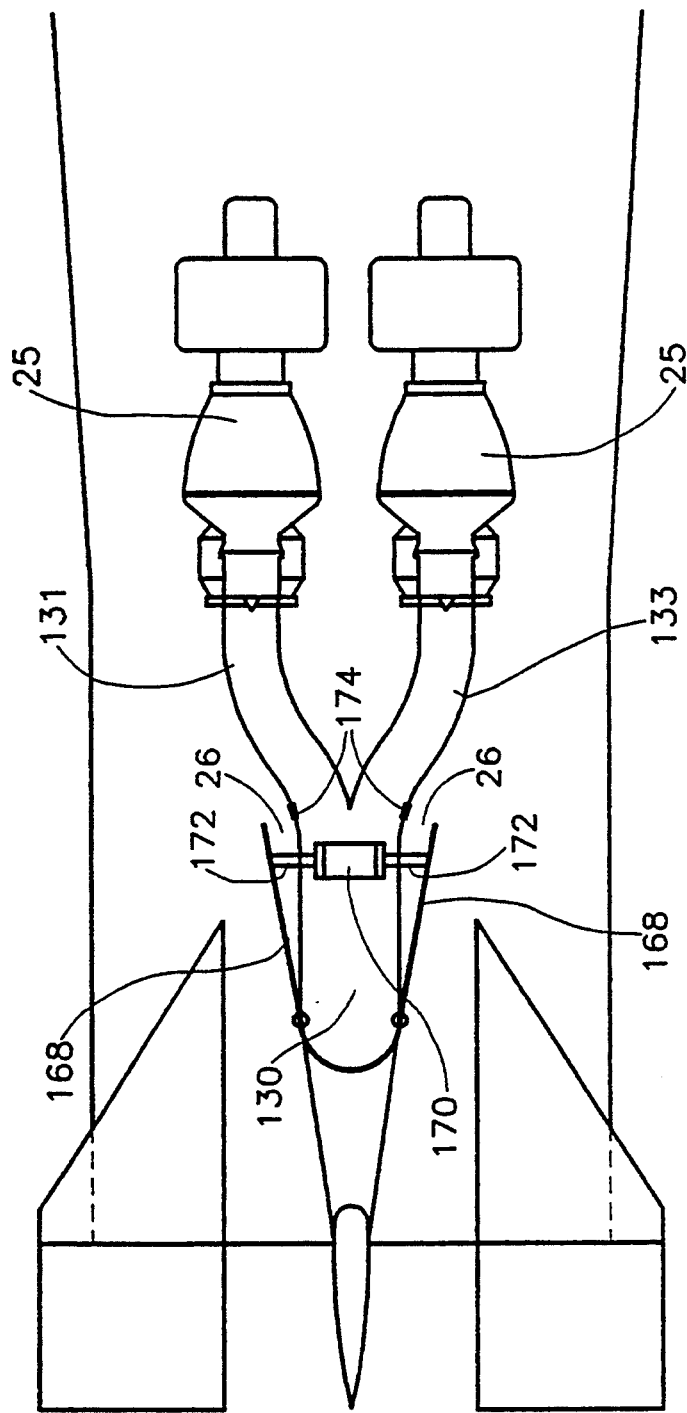
FIG. 19 is a top section illustration taken along the lines XIX—XIX of FIG. 16.

FIG. 19 shows a top view of the first propulsion system. The two turbines 25 lie generally aside one another. As can seen, air duct 130 is a branched passage, with one air duct branch 131 bringing air to one turbine 25 and a second air duct branch 133 bringing air to a second turbine 25.

Air intake inlets 26 comprise doors 168 which are opened and closed upon command from the command center via a piston typically comprising two rods 172. Seals 174 maintain the closure of the doors 168 during undersea operations.

Figure 20:
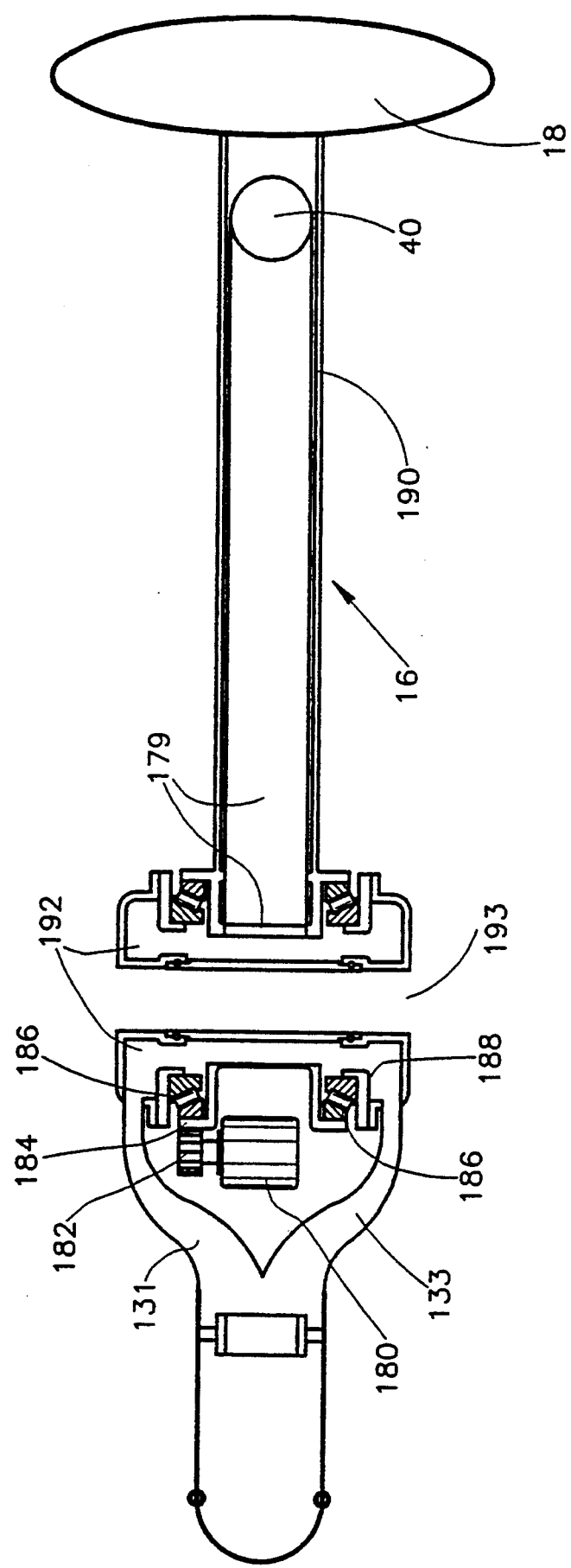
FIG. 20 is a top section illustration taken along the lines XX—XX of FIG. 17.
Figure 21:
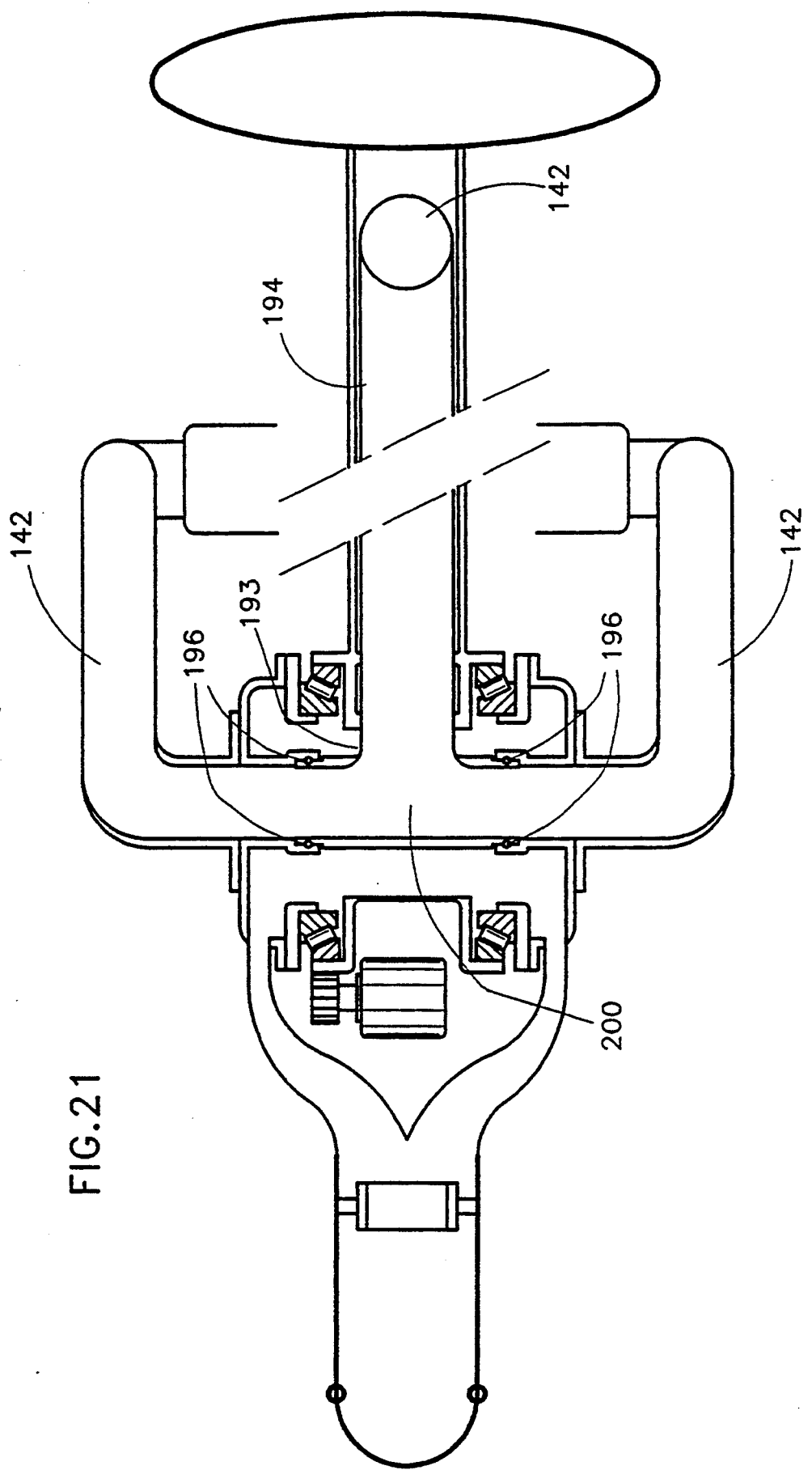
FIG. 21 is a top section illustration taken along the lines XXI—XXI of FIG. 16.

Reference is now made to FIGS. 20-21 which illustrate elements of a retraction system for the mast 16. For clarity, the mast 16 is shown retracted. The retraction system comprises an electric motor 180 coupled to a gear 182 for rotating at least one disk flange 184. Disk flanges 184 are connected to a drum 179 which forms the base of mast 16. Each disk flange 184 is geared along the outer side for coupling with gear 182 and the inner side is machined as a bearing seat for holding one of a set of extra strong spherical roller thrust bearings 186, such as the Series 292 type from SKF. Bearings 186 also sit on a sea 188 which is connected to the hull 10. Since the mast 16 is attached to flanges 184, when the flanges 184 rotate, the mast 16 extends or retracts.

In accordance with an alternative embodiment, two gears are utilized instead of gear 182. In the alternative embodiment, each gear rotates one of flanges 184 and the gears rotate in unison.

FIG. 20 additionally illustrates the air intake system of the mast 16. Air intake inlet 40 is connected to a pipe inside mast 16 which opens into a fixed torus manifold 192 with an inner hole 193. Torus manifold 192 is connected to air duct branches 131 and 133. The circular shape of the manifold 192 can be seen in FIG. 16. Pipe 190, as part of the mast 16, is connected to drum 179 and thus, rotates around the torus manifold 192 during extension or retraction of mast 16.

FIG. 21 illustrates the air exhaust system of the mast 16. Air outlet 42 is connected to a T-shaped pipe 194 which, in turn, is connected via o-rings 196 to exhaust manifold 142, located in the inner hole 193 of torus manifold 192. Pipe 194 rotates with respect to exhaust manifold 142 during extension and retraction of the mast 16. Sealing between the pipe 194 and the exhaust manifold 142 is provided by o-rings 196.

Reference is now made to FIGS. 22, 23A and 23B which illustrate elements of the undersea propulsion system. The undersea propulsion system comprises a nozzle 210, similar to a Kourt nozzle, for ensuring that the majority of the water passes through a propeller disk created by the movement of propeller 46. As is known in the art, this makes for quieter propulsion.

The undersea propulsion system additionally comprises a water inlet system, shown in detail in FIG. 23A, comprising two inlet openings 212, one on each side of the craft, covered with grills 213. The water inlet system additionally comprises two tunnels 215, one on each side of the craft, for funneling the incoming water towards the propeller 46. The rotation propeller 46 thrusts the water out of nozzle 210 via opening 214, and in this manner gives forward thrust to the craft.

Reverse thrust is achieved by reverse rotation of the propeller 46. For reverse thrust, water is sucked into the water inlet system through opening 214 and sent out through the inlet openings 212.

Steering is achieved through movements of rudder 50 about a rudder pivot 217. The angle of the rudder 50 with respect to the hull 10 defines the direction in which the water flows out of opening 214 and thus, defines the direction in which the craft moves. The angles of control surfaces 48 with respect to the horizontal axis of the hull 10 also define the flow direction of the water. Additional movement control is provided outside of the propeller area by control surfaces 48 which, as mentioned hereinabove, control pitch and roll movement of the craft.

The flow of water is shown in FIG. 23A which shows a top section of the water inlet system. The water inlet system is shaped to provide a large flux of water across the propeller 46. To increase the flux of water, a inlet extender 216 is typically included in the water inlet system. Inlet extender 216 is a pivoted scoop which extends beyond the side of the hull 10 to bring water into the water inlet system. Inlet extender 216 is typically included in craft whose hull 10 is so streamlined that water flows over inlet openings 212 rather than entering the inlet. Inlet extender 216 produces a slightly less streamlined hull shape but increases the flux of water across the propeller 46.

FIG. 23B is a cross-sectional view through the nozzle 210. It can be seen that the nozzle 210 is only slightly larger than the radius of the propeller 46. This ensures that as mentioned hereinabove, the majority of the water passing in the vicinity of the propeller 46 actually pass through the propeller disk created by the movement of the propeller 46.

Figure 25A:
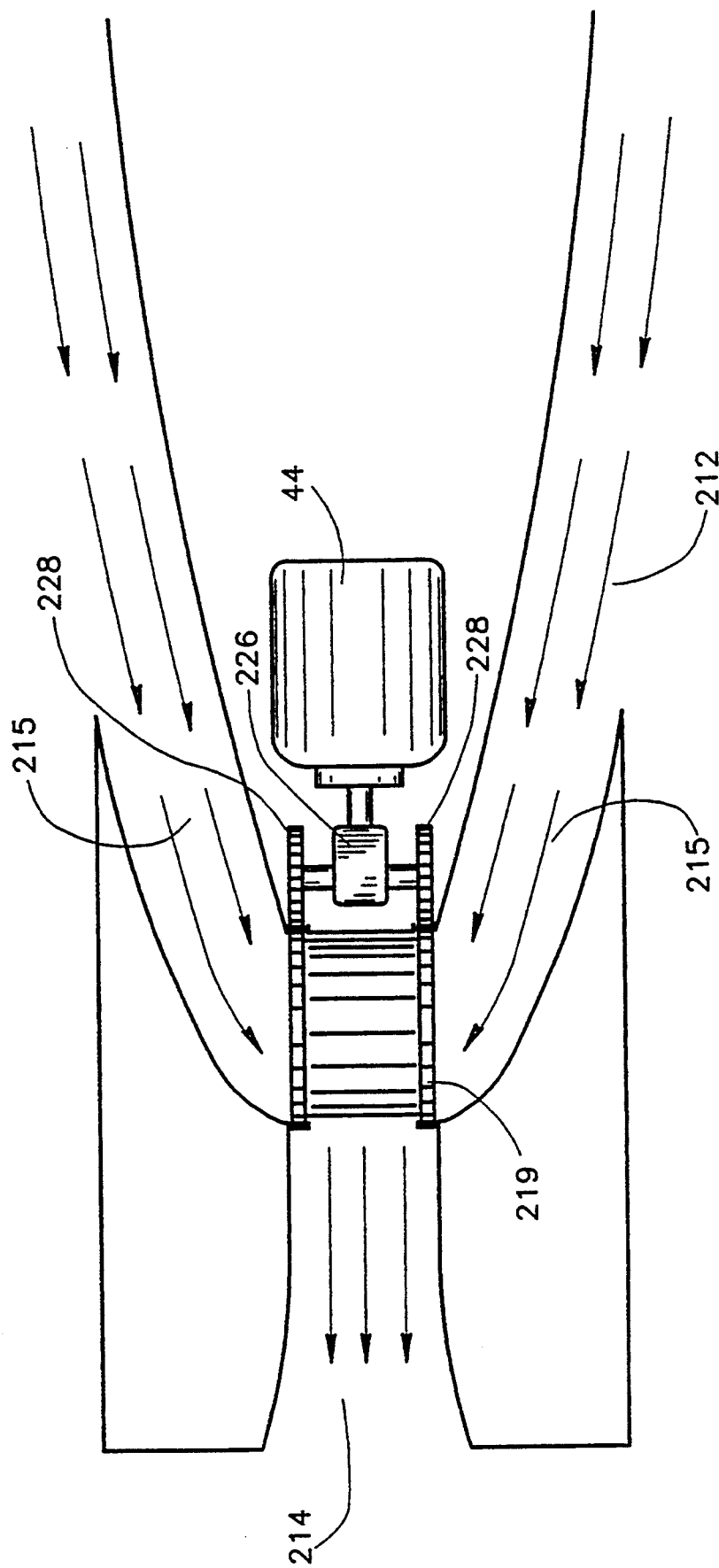
FIG. 25A is a top section illustration taken along the lines XXVA—XXVA of FIG. 24.
Figure 25B:
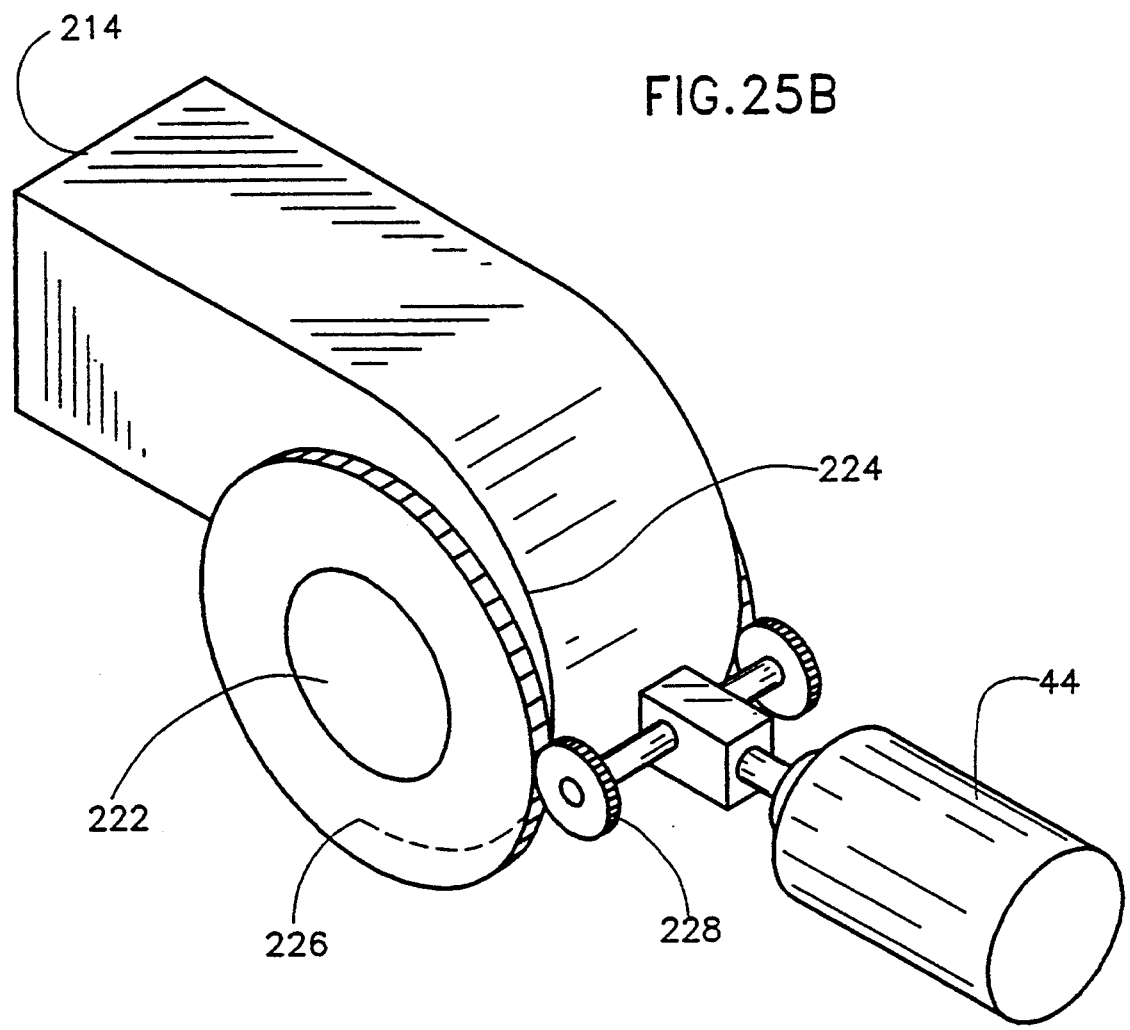
FIG. 25B is a pictorial illustration of elements of the alternative undersea propulsion system of FIG. 24.

In accordance with an alternative embodiment of the undersea propulsion system of the present invention and as illustrated in FIGS. 24, 25A and 25B, the propeller 46 is replaced by a centrifugal pump 220, such as is typically used in air conditioning systems. An example centrifugal pump 220 is the Radial Compressor by Rosenberg Ventilatoren GmbH of Kunzelsau-Gaisbach, West Germany. The water inlet system remains the same as in the previous embodiment; however, it brings the water to an inlet axle 222 (FIG. 25B). The centrifugal pump 220 then spins the water in a direction perpendicular to that of the inlet axis. The water is collected in a pipe 224 whose radius of contour increases from a small value beginning at a location 220 until it reaches the size of opening 214. The water is directed along the pipe 224 to the opening 214.

The centrifugal pump 220 is operated by motor 44 coupled to a gear box 226 (FIG. 25A) operating gears 228. Gears 228 engage teeth on a disk 229 connected to centrifugal pump 220.

Reference is now made to FIGS. 26A, 26B, 27, 28, 29 and 30 which illustrate a further alternative embodiment of the undersea propulsion system of the present invention. In this embodiment, the propulsion system is a fishtail 230 which produces forward thrust by undulating back and forth. The fishtail 230 can be located inside the tunnel 215, as in FIG. 26A, or the water inlet system can be eliminated, as shown in FIG. 26B.

The fishtail 230 is typically comprised of a multiplicity of chain links 232 linked together as in a bicycle chain. The chain links 232 are numbered 2-9 in FIG. 28 and the first link is the attachment point to the hull 10. Each chain link 232 is controlled via a push-pull element 234 (FIG. 28L), such as the Push Pull by Teleflex Co., which is individually controlled via a power device 236 (FIG. 29), such as an hydraulic pump and piston.

Each push-pull device 234 is located eccentric from an axis 238 of its corresponding chain element 232. Each push-pull element 234 snakes through holes in the axes of the entirety chain links 232 preceding its corresponding chain link 232.

The push-pull elements 234 are controlled via the command center such that they operate in unison to produce an undulation. As is known in the art, the undulation and the forward motion of the craft produce eddies 240 (FIG. 27) staggered along the sides of the fishtail 230.

Figure 27:
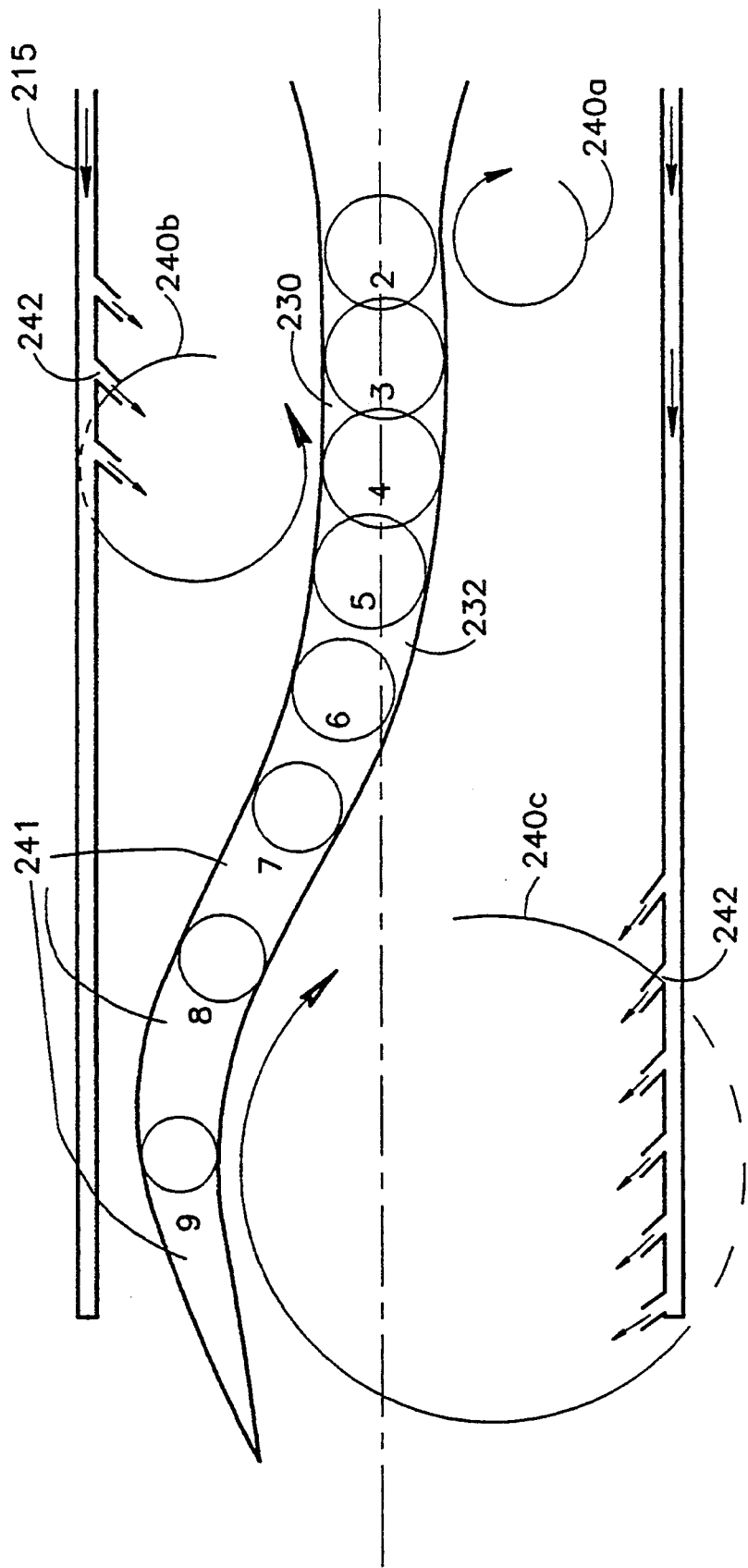
FIG. 27 is a top section illustration taken along the lines XXVII—XXVII of FIG. 26A.
Figure 28:
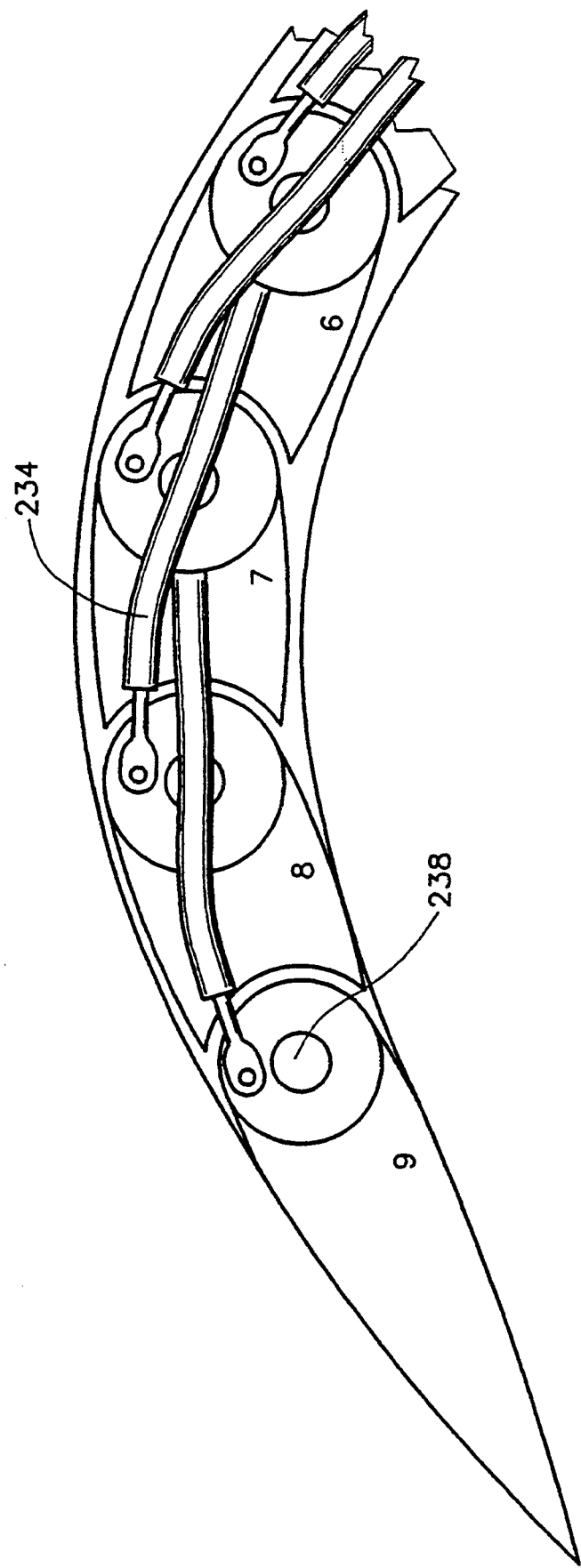
FIG. 28 is a top section illustration of the operation of the undersea propulsion system of FIGS. 26A and 26B.
Figure 29:
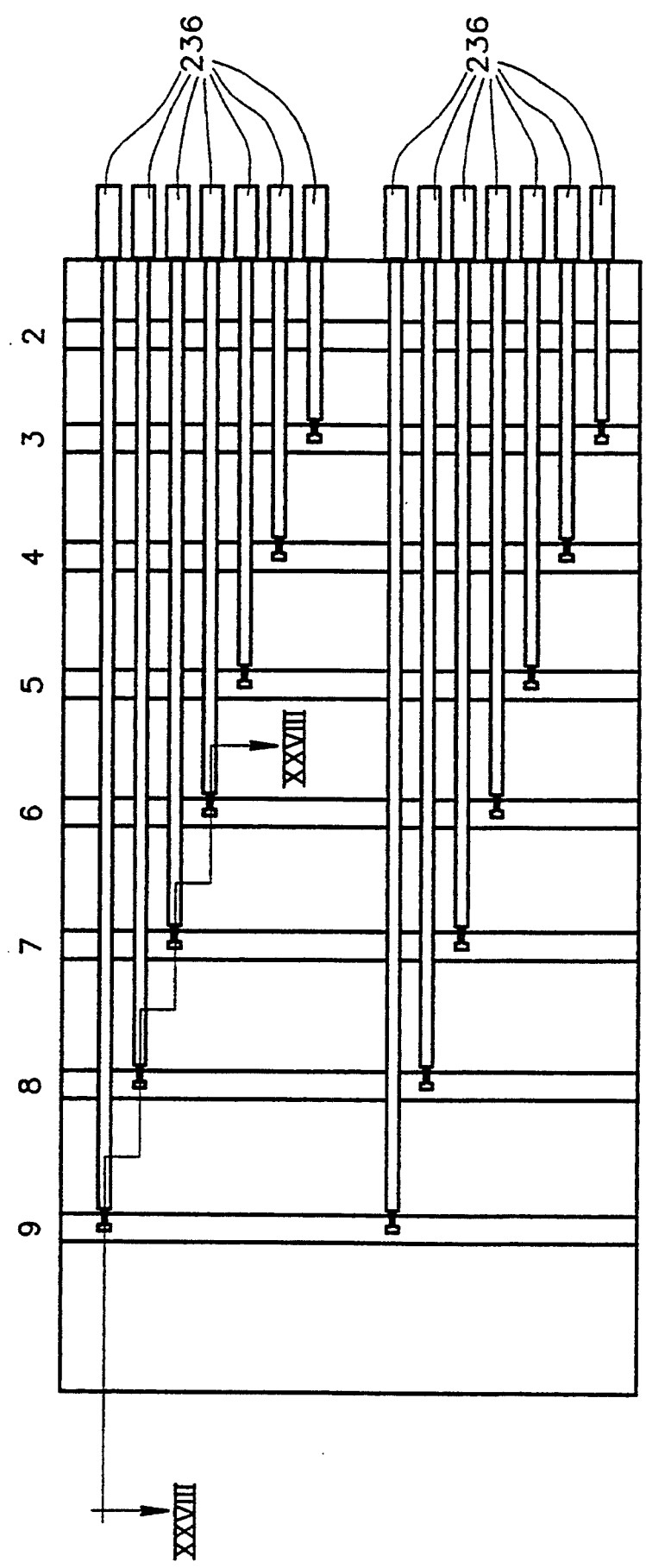
FIG. 29 is a schematic illustration of the structure of the undersea propulsion system of FIGS. 26A and 26B.

As shown in FIG. 27, each eddy 240 begins as eddy 240a near chain links 1 and 2. This happens because fishtail 230 drags with it as a wake the water near chain links 1 and 2, giving it rotational motion.

The undulation of the fishtail 230 causes the fishtail 230 to move away, in both the forward and transverse directions, from the newly begun eddy 240a which remains stationary in the water. The fishtail 230 returns to eddy 240a at a location further along the fishtail 230, in a region of concavity such as at links 4-6. The fishtail 230 grabs the eddy and pulls it along, as described hereinabove, giving it more rotational energy. This amplifies the eddy to the size shown in eddy 240b. The process continues such that the eddies 240 along the body of the fishtail 230 are progressively larger.

The final eddy, 240c, is typically quite large. The tail 241 of the fishtail 230, chain links 7-9, typically grabs the eddy 240c when the tail 241 is oriented nearly perpendicular to the forward direction. The water on the eddy side of the tail 241, the pressure side, typically moves fairly slowly while the water on the non-eddy side, the suction or leeward side, of the tail 241 moves more quickly. Thus, a lift vector in a direction close to that of the forward motion is created, transferring energy from the eddy 240c to the fishtail 230 thereby giving forward thrust to the craft.

In the manner described hereinabove, the eddy 240c gives power to the fishtail 230. To increase the power of the eddies 240, in the embodiment of FIG. 26A, a multiplicity of water jets 242 are preferably installed along the inside of the tunnel 215. The water jets 242 located near the locations of concavity of the fishtail 230 are turned on in order to amplify the energy of the eddies 240 near the water jets 242. The energy from the water jets 242 is converted, via the eddies 240 and through lift on the tail 241, to forward thrust of the craft, thereby amplifying the effect of the eddies 240.

It will be appreciated that the water jets 242 are typically included in the embodiment of FIG. 26A because the eddies 240 often cannot be completely formed due to the restricted space in the tunnel 215. Thus, water jets additionally replace any lost energy due to the restricted space.

Figure 30:
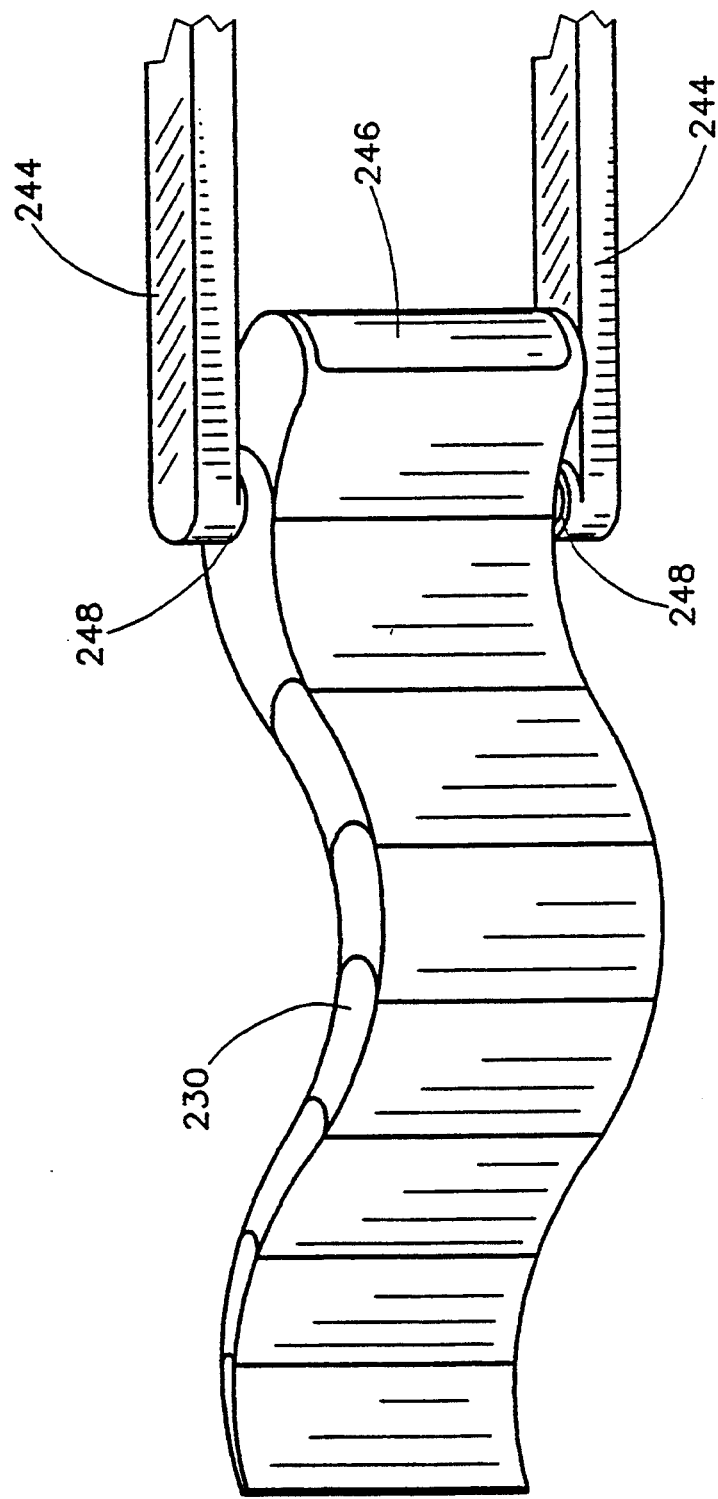
FIG. 30 is a pictorial illustration of an alternative embodiment of the undersea propulsion system of FIG. 26A.

In accordance with an alternative embodiment of the fishtail undersea propulsion system, shown in FIG. 30, the fishtail 230 is suspended from the hull 10 via suspending arms 244, thereby enabling a head 246 of fishtail 230 to move freely. This enables the first eddy 240a to be created more efficiently.

Suspending arms 244 are connected to fishtail 230 via hollow hinges 248. Inside of suspending arms 244 and hollow hinges 248 are located all the power lines and communication equipment necessary for operating Fishtail 230, such as portions of the push-pull elements 234 and hydraulic pipes.

It will be appreciated that the fishtail undersea propulsion system described hereinabove is a relatively quiet system. The only noise is created by the power devices 236, each of which is fairly small and can be individually enclosed to reduce noise.

It will be appreciated by those skilled in the art that the present invention is not limited by what has been particularly shown and described hereinabove. The scope of the present invention is defined only by the claims which follow:

I claim:

1. A sea vessel comprising:
   a hull;
   a retractable generally planar hydrofoil attached to said hull and configured for disposition in an extended orientation for vessel operation in a hydrofoil mode, said hydrofoil comprising a main portion lying in a first plane and pivotably mounted onto said hull about a first pivot axis extending generally perpendicular to said first plane and a tip portion pivotably mounted onto the main portion at a second pivot axis, lying in said first plane, and extending outwardly from said main portion and which is selectably orientable with respect to the main portion, said tip portion being unsupported on the main portion other than at said second pivot axis; and
   propulsion means for propulsion of said vessel.

2. A sea vessel comprising:
   a hull;
   retractable hydrofoil means attached to said hull and configured for disposition in an extended orientation for vessel operation in a hydrofoil mode and for disposition in any selectable partially retracted into the hull orientation for vessel operation in an undersea mode and being capable of full retraction inside the hull;
   hydrofoil retraction and extension apparatus operative to displace the retractable hydrofoil means by a desired amount out of and into the hull; and
   propulsion means for propulsion of said vessel in both said undersea mode and said hydrofoil mode.

3. A sea vessel comprising:
   a hull;
   retractable hydrofoil means attached to said hull and configured for disposition in an extended orientation extending below and beyond the sides of hull for vessel operation in a hydrofoil mode and for disposition in an at least partially retracted into the hull orientation for vessel operation in an undersea mode;
   hydrofoil retraction and extension apparatus operative to displace the retractable hydrofoil means out of and into the hull; and
   propulsion means for propulsion of said vessel in both said undersea mode and said hydrofoil mode.

* * * * *